(12) United States Patent
Muto et al.

(10) Patent No.: US 11,242,814 B2
(45) Date of Patent: Feb. 8, 2022

(54) SYSTEM FOR DETECTING ABNORMALITY IN BLOW-BY GAS FEED PATH IN INTERNAL COMBUSTION ENGINE

(71) Applicant: TOYOTA JIDOSHA KABUSHIKI KAISHA, Toyota (JP)

(72) Inventors: Harufumi Muto, Miyoshi (JP); Naoya Okubo, Chiryu (JP); Akihiro Katayama, Toyota (JP); Yosuke Hashimoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 27 days.

(21) Appl. No.: 15/930,483

(22) Filed: May 13, 2020

(65) Prior Publication Data
US 2020/0378329 A1  Dec. 3, 2020

(30) Foreign Application Priority Data

May 30, 2019  (JP) .............................. JP2019-101322
Jan. 15, 2020  (JP) .............................. JP2020-004471

(51) Int. Cl.
*F01M 13/02* (2006.01)
*F02D 41/14* (2006.01)
(Continued)

(52) U.S. Cl.
CPC ............ *F02D 41/22* (2013.01); *F01M 13/023* (2013.01); *F02D 41/1405* (2013.01); *F02M 35/10222* (2013.01); *F01M 2013/0083* (2013.01); *F01M 2013/0088* (2013.01); *F01M 2013/0094* (2013.01); *F01M 2250/66* (2013.01); *F02D 2200/0408* (2013.01); *F02D 2200/101* (2013.01); *F02D 2200/703* (2013.01); *F02D 2250/08* (2013.01)

(58) Field of Classification Search
CPC ................. F01M 13/00; F01M 13/023; F01M 2013/0083; F01M 2013/0088; F01M 2013/0094; F01M 2250/62; F01M 2250/66; F02D 41/1405; F02D 41/22; F02D 2200/0406; F02D 2200/0408; F02D 2250/08; F02M 35/10222
USPC .............. 73/114.31, 114.32, 114.33, 114.37; 123/572–574

See application file for complete search history.

(56) References Cited

U.S. PATENT DOCUMENTS 6,098,603 A    8/2000  Maegawa et al.
7,509,210 B2 *  3/2009  Tsuda ...................... F02D 41/18
                                                                 701/114

(Continued)

FOREIGN PATENT DOCUMENTS

JP           10-184336 A       7/1998

*Primary Examiner* — Erick R Solis
(74) *Attorney, Agent, or Firm* — Oblon, McClelland, Maier & Neustadt, L.L.P.

(57) ABSTRACT

A learned neural network learned in weights using an engine load, an engine speed, and an intake pressure inside the engine intake passage downstream of the throttle valve (19) as input parameters of the neural network and using leakage of blow-by gas from a blow-by gas feed path (20) as a truth label is stored. At the time of operation of the vehicle, the learned neural network is used to detect the abnormality of leakage of blow-by gas from the blow-by gas feed path (20) from the above input parameters.

7 Claims, 26 Drawing Sheets

(51) Int. Cl.
*F02D 41/22* (2006.01)
*F02M 35/10* (2006.01)
*F01M 13/00* (2006.01)

(56) References Cited

U.S. PATENT DOCUMENTS

| | | | | |
|---|---|---|---|---|
| 8,181,509 B2 * | 5/2012 | Ibuki | ............... | F02B 37/013 |
| | | | | 73/114.79 |
| 2001/0010214 A1 * | 8/2001 | Maegawa | ............... | F02D 41/22 |
| | | | | 123/339.23 |
| 2005/0251322 A1 * | 11/2005 | Wang | ............... | G01M 15/08 |
| | | | | 701/114 |
| 2018/0291830 A1 * | 10/2018 | Kurosawa | ............... | F01M 13/022 |

* cited by examiner

FIG. 11

| INPUT VALUE | PARAMETER |
|---|---|
| $x_1$ | ENGINE LOAD |
| $x_2$ | ENGINE SPEED |
| $x_3$ | MEASURED VALUE OF INTAKE PRESSURE DOWNSTREAM OF THROTTLE VALVE |

FIG. 12

| OUTPUT VALUE | ABNORMAL STATE | OPERATING STATE |
|---|---|---|
| $y_1', y_1$ | ABNORMALITY OF LEAKAGE OF BLOW-BY GAS | LOW LOAD STEADY |
| $y_2', y_2$ | ABNORMALITY OF STUCK OPENING OF PCV VALVE | |
| $y_3', y_3$ | NORMAL | |

FIG. 13

| No. | $x_1$ | $x_2$ | $x_3$ | $yt_1$ | $yt_2$ | $yt_3$ |
|---|---|---|---|---|---|---|
| 1 | $x_{11}$ | $x_{21}$ | $x_{31}$ | $yt_{11}$ | $yt_{21}$ | $yt_{31}$ |
| 2 | $x_{12}$ | $x_{22}$ | $x_{32}$ | $yt_{12}$ | $yt_{22}$ | $yt_{32}$ |
| ⋮ | ⋮ | ⋮ | ⋮ | ⋮ | ⋮ | ⋮ |
| m−1 | $x_{1m-1}$ | $x_{2m-1}$ | $x_{3m-1}$ | $yt_{1m-1}$ | $yt_{2m-1}$ | $yt_{3m-1}$ |
| m | $x_{1m}$ | $x_{2m}$ | $x_{3m}$ | $yt_{1m}$ | $yt_{2m}$ | $yt_{3m}$ |

FIG. 15

| OUTPUT VALUE | ABNORMAL STATE | OPERATING STATE |
|---|---|---|
| $y_1', y_1$ | ABNORMALITY OF STUCK CLOSING OF PCV VALVE | MEDIUM LOAD STEADY |
| $y_2', y_2$ | NORMAL | |

FIG. 16

| No. | $x_1$ | $x_2$ | $x_3$ | $yt_1$ | $yt_2$ |
|---|---|---|---|---|---|
| 1 | $x_{11}$ | $x_{21}$ | $x_{31}$ | $yt_{11}$ | $yt_{21}$ |
| 2 | $x_{12}$ | $x_{22}$ | $x_{32}$ | $yt_{12}$ | $yt_{22}$ |
| ⋮ | ⋮ | ⋮ | ⋮ | ⋮ | ⋮ |
| m-1 | $x_{1m-1}$ | $x_{2m-1}$ | $x_{3m-1}$ | $yt_{1m-1}$ | $yt_{2m-1}$ |
| m | $x_{1m}$ | $x_{2m}$ | $x_{3m}$ | $yt_{1m}$ | $yt_{2m}$ |

FIG. 17

| INPUT VALUE | PARAMETER |
|---|---|
| $x_1$ | ENGINE LOAD |
| $x_2$ | ENGINE SPEED |
| $x_3$ | ESTIMATED VALUE OF INTAKE PRESSURE DOWNSTREAM OF THROTTLE VALVE |

FIG. 18

| INPUT VALUE | PARAMETER |
|---|---|
| $x_1$ | ENGINE LOAD |
| $x_2$ | ENGINE SPEED |
| $x_3$ | MEASURED VALUE OF INTAKE PRESSURE DOWNSTREAM OF THROTTLE VALVE |
| $x_4$ | ESTIMATED VALUE OF INTAKE PRESSURE DOWNSTREAM OF THROTTLE VALVE |

FIG. 20

| No. | $x_1$ | $x_2$ | $x_3$ | $x_4$ | $yt_1$ | $yt_2$ | $yt_3$ |
|---|---|---|---|---|---|---|---|
| 1 | $x_{11}$ | $x_{21}$ | $x_{31}$ | $x_{41}$ | $yt_{11}$ | $yt_{21}$ | $yt_{31}$ |
| 2 | $x_{12}$ | $x_{22}$ | $x_{32}$ | $x_{42}$ | $yt_{12}$ | $yt_{22}$ | $yt_{32}$ |
| ⋮ | ⋮ | ⋮ | ⋮ | ⋮ | ⋮ | ⋮ | ⋮ |
| m−1 | $x_{1m-1}$ | $x_{2m-1}$ | $x_{3m-1}$ | $x_{4m-1}$ | $yt_{1m-1}$ | $yt_{2m-1}$ | $yt_{3m-1}$ |
| m | $x_{1m}$ | $x_{2m}$ | $x_{3m}$ | $x_{4m}$ | $yt_{1m}$ | $yt_{2m}$ | $yt_{3m}$ |

FIG. 22

| No. | $x_1$ | $x_2$ | $x_3$ | $x_4$ | $yt_1$ | $yt_2$ |
|---|---|---|---|---|---|---|
| 1 | $x_{11}$ | $x_{21}$ | $x_{31}$ | $x_{41}$ | $yt_{11}$ | $yt_{21}$ |
| 2 | $x_{12}$ | $x_{22}$ | $x_{32}$ | $x_{42}$ | $yt_{12}$ | $yt_{22}$ |
| ⋮ | ⋮ | ⋮ | ⋮ | ⋮ | ⋮ | ⋮ |
| m−1 | $x_{1m-1}$ | $x_{2m-1}$ | $x_{3m-1}$ | $x_{4m-1}$ | $yt_{1m-1}$ | $yt_{2m-1}$ |
| m | $x_{1m}$ | $x_{2m}$ | $x_{3m}$ | $x_{4m}$ | $yt_{1m}$ | $yt_{2m}$ |

FIG. 23

| INPUT VALUE | PARAMETER |
|---|---|
| $x_1$ | ENGINE LOAD |
| $x_2$ | ENGINE SPEED |
| $x_3$ | AMOUNT OF INTAKE AIR |
| $x_4$ | THROTTLE VALVE OPENING DEGREE |
| $x_5$ | ATMOSPHERIC TEMPERATURE |
| $x_6$ | ATMOSPHERIC PRESSURE |

FIG. 25

| No. | $x_1$ | $x_2$ | ... | $x_6$ | $yt_1$ | $yt_2$ | $yt_3$ |
|---|---|---|---|---|---|---|---|
| 1 | $x_{11}$ | $x_{21}$ | ... | $x_{61}$ | $yt_{11}$ | $yt_{21}$ | $yt_{31}$ |
| 2 | $x_{12}$ | $x_{22}$ | ... | $x_{62}$ | $yt_{12}$ | $yt_{22}$ | $yt_{32}$ |
| ⋮ | ⋮ | ⋮ | ... | ⋮ | ⋮ | ⋮ | ⋮ |
| m−1 | $x_{1m-1}$ | $x_{2m-1}$ | ... | $x_{6m-1}$ | $yt_{1m-1}$ | $yt_{2m-1}$ | $yt_{3m-1}$ |
| m | $x_{1m}$ | $x_{2m}$ | ... | $x_{6m}$ | $yt_{1m}$ | $yt_{2m}$ | $yt_{3m}$ |

FIG. 27

| No. | $x_1$ | $x_2$ | ... | $x_6$ | $yt_1$ | $yt_2$ |
|---|---|---|---|---|---|---|
| 1 | $x_{11}$ | $x_{21}$ | ... | $x_{61}$ | $yt_{11}$ | $yt_{21}$ |
| 2 | $x_{12}$ | $x_{22}$ | ... | $x_{62}$ | $yt_{12}$ | $yt_{22}$ |
| ⋮ | ⋮ | ⋮ | ... | ⋮ | ⋮ | ⋮ |
| m−1 | $x_{1m-1}$ | $x_{2m-1}$ | ... | $x_{6m-1}$ | $yt_{1m-1}$ | $yt_{2m-1}$ |
| m | $x_{1m}$ | $x_{2m}$ | ... | $x_{6m}$ | $yt_{1m}$ | $yt_{2m}$ |

SYSTEM FOR DETECTING ABNORMALITY IN BLOW-BY GAS FEED PATH IN INTERNAL COMBUSTION ENGINE

FIELD

The present invention relates to a system for detecting an abnormality in a blow-by gas feed path in an internal combustion engine.

BACKGROUND

In an internal combustion engine, a part of the combustion gas inside combustion chambers leaks out through clearances of piston rings to the inside of a crankcase. The gas leaking to the inside of the crankcase, that is, blow-by gas, remains in the crankcase. This blow-by gas contains strongly acidic water vapor. Due to this strongly acidic water vapor, degradation of the engine oil or formation of rust inside the engine is caused, so it is necessary to ventilate the inside of the crankcase so as not to allow blow-by gas to remain inside the crankcase. Further, blow-by gas contains a large amount of unburned gases. Therefore, blow-by gas cannot be discharged to the atmosphere. Accordingly, usually, an internal combustion engine is provided with a blow-by gas ventilation system designed to feed blow-by gas in the engine crankcase through a blow-by gas feed path to the inside of an engine intake passage downstream of a throttle valve and make the blow-by gas fed to the inside of the engine intake passage burn in the combustion chambers. This blow-by gas ventilation system is generally called a "PCV (positive crankcase ventilation) system".

In this regard, in such a PCV system, sometimes blow-by gas leaks from the blow-by gas feed path due to some sort of reason. If blow-by gas leaks to the atmosphere, the leakage of blow-by gas into the atmosphere has to be immediately detected. On the other hand, if blow-by gas leaks into the atmosphere, the pressure inside the blow-by gas feed path changes. Therefore, a system for detecting an abnormality in a blow-by feed path arranging a pressure sensor in the blow-by gas feed path and detecting the abnormality of leakage of blow-by gas from the blow-by gas feed path from the change in pressure inside the blow-by gas feed path detected by this pressure sensor is known (for example, see Japanese Unexamined Patent Publication No. 10-184336).

SUMMARY

However, in this system for detecting an abnormality of a blow-by gas feed path, there is the problem that to detect an abnormality of leakage of blow-by gas, it is necessary to place a pressure sensor dedicated to detection of the abnormality inside the blow-by gas feed path. Therefore, the inventors studied the method of detecting the abnormality of leakage of blow-by gas without the need for using such a dedicated pressure sensor by utilizing the results of detection of a detector ordinarily provided for control of an internal combustion engine and as a result focused on the fact that if leakage of blow-by gas occurs, the intake pressure inside the intake passage downstream of the throttle valve changes and that this change of the intake pressure can be found by a detector ordinarily provided for control of the internal combustion engine etc.

However, in this case, the intake pressure inside the intake passage downstream of the throttle valve changes depending on the state of leakage of the blow-by gas and also changes depending on the operating state of the engine, so it is not easy to accurately judge if leakage of the blow-by gas occurs from the change in the intake pressure inside the intake passage downstream of the throttle valve.

Therefore, the present invention uses a neural network to try to accurately judge the abnormality of leakage of blow-by gas from the change in the intake pressure inside the intake passage downstream of the throttle valve.

That is, according to the present invention, there is provided a system for detecting an abnormality in a blow-by gas feed path in an internal combustion engine comprising an intake air amount detector arranged in an engine intake passage, a throttle valve arranged in the engine intake passage downstream of the intake air detector, blow-by gas in an engine crankcase being fed through a blow-by gas feed path into the engine intake passage downstream of the throttle valve, and a PCV valve arranged in the blow-by gas feed path to control an amount of flow of blow-by gas, wherein a learned neural network learned in weights using an engine load, an engine speed, and an intake pressure in the engine intake passage downstream of the throttle valve as input parameters of the neural network and using leakage of blow-by gas from the blow-by gas feed path as a truth label is stored and, at the time of operation of a vehicle, the learned neural network is used to detect the abnormality of leakage of blow-by gas from the blow-by gas feed path from the input parameters.

Furthermore, according to the present invention, there is provided a system for detecting an abnormality in a blow-by gas feed path in an internal combustion engine comprising an intake air amount detector arranged in an engine intake passage, a throttle valve arranged in the engine intake passage downstream of the intake air detector, blow-by gas in an engine crankcase being fed through a blow-by gas feed path into the engine intake passage downstream of the throttle valve, and a PCV valve arranged in the blow-by gas feed path to control an amount of flow of blow-by gas, wherein a learned neural network learned in weights using an engine load, an engine speed, an amount of intake air detected by the intake air amount detector, an atmospheric pressure, an atmospheric temperature, and an opening degree of the throttle valve as input parameters of the neural network and using leakage of blow-by gas from the blow-by gas feed path as a truth label is stored and, at the time of operation of a vehicle, the learned neural network is used to detect the abnormality of leakage of blow-by gas from the blow-by gas feed path from the input parameters.

Advantageous Effects of Invention

By learning the relationship between the state of leakage of blow-by gas and the operating state of the engine and the intake pressure using a neural network, it becomes possible to accurately detect leakage of blow-by gas.

BRIEF DESCRIPTION OF DRAWINGS

FIG. 11 is a view showing a list of input values.

FIG. 12 is a view showing a list of output values.

FIG. 13 is a view showing a training data set.

FIG. 15 is a view showing a list of output values.

FIG. 16 is a view showing a training data set.

FIG. 17 is a view showing a list of input values in another embodiment.

FIG. 18 is a view showing a list of input values in still another embodiment.

FIG. 20 is a view showing a training data set.

FIG. 22 is a view showing a training data set.

FIG. 23 is a view showing a list of input values in still another embodiment.

FIG. 25 is a view showing a training data set.

FIG. 27 is a view showing a training data set.

DESCRIPTION OF EMBODIMENTS

Overall Configuration of Internal Combustion Engine

Figure 1:
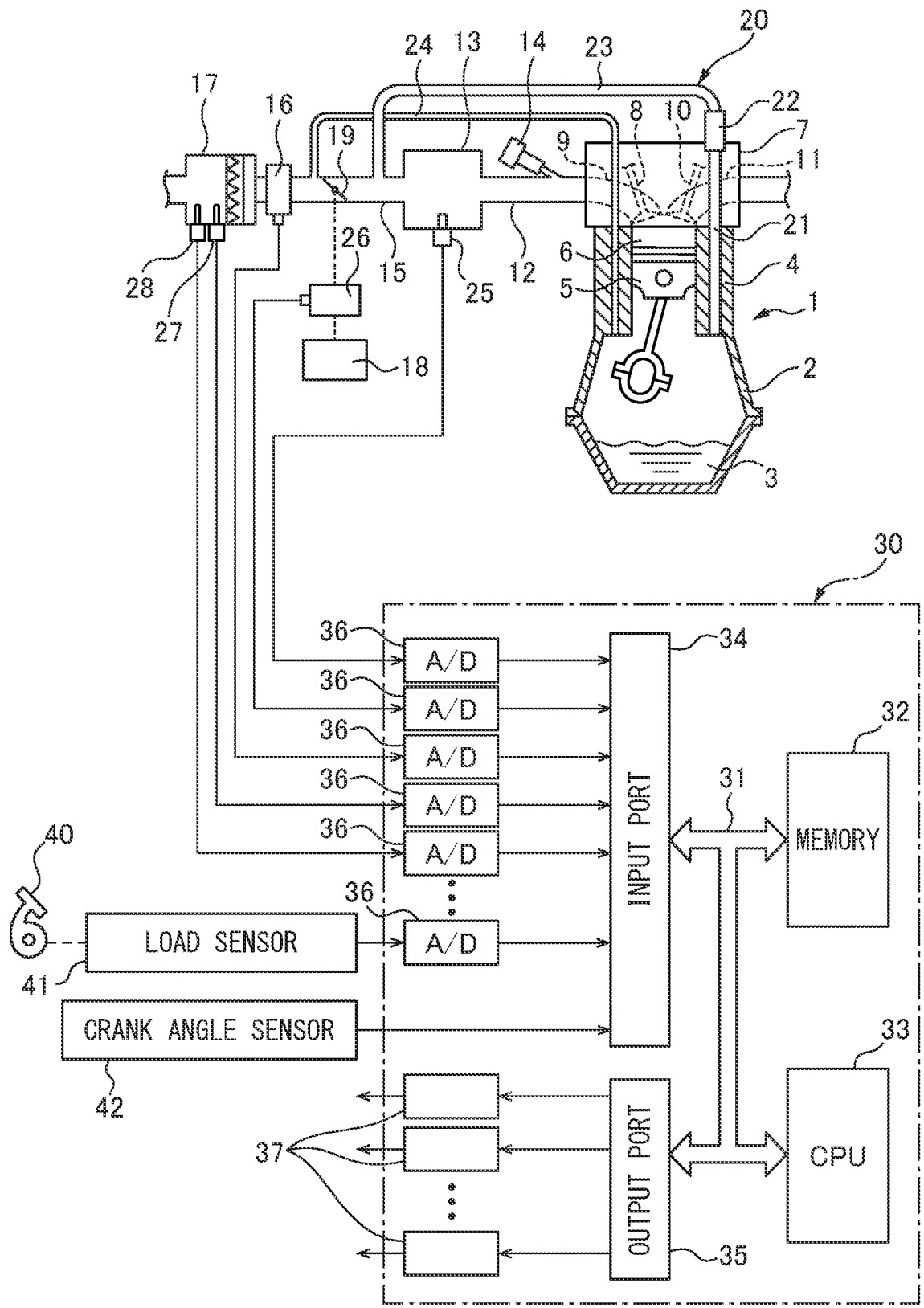
FIG. 1 is an overall view of a system for detecting an abnormality in a blow-by gas feed path.

FIG. 1 shows an overall view of a system for detecting an abnormality in a blow-by gas feed path. Referring to FIG. 1, 1 indicates an engine body, 2 a crankcase, 3 lubrication oil remaining in the crankcase 2, 4 a cylinder block, 5 a piston, 6 a combustion chamber, 7 a cylinder head, 8 an intake valve, 9 an intake port, 10 an exhaust valve, and 11 an exhaust port. The intake ports 9 are connected through intake branch pipes 12 to a surge tank 13 common for all of the cylinders. In the intake branch pipes 12, fuel injectors 14 are arranged. The surge tank 13 is connected through an intake duct 15 and intake air amount detector 16 to an air cleaner 17.

Inside the intake duct 15, a throttle valve 19 driven by an actuator 18 is arranged.

On the other hand, as shown in FIG. 1, the engine body 1 is provided with a blow-by gas feed path 20 for feeding blow-by gas filling the inside of the crankcase 2 to the intake passage downstream of the throttle valve 19. In the example shown in FIG. 1, this blow-by gas feed path 20 is comprised of a blow-by gas passage 21 extending from the inside of the crankcase 2 through the cylinder block 4 and cylinder head 7 upward, a PCV valve 22 attached to the top end part of this blow-by gas passage 21 and controlling the amount of flow of the blow-by gas, and a blow-by gas passage 23 extending from this PCV valve 22 to the inside of the intake duct 15 downstream of the throttle valve 19. Further, the engine body 1 is provided with a fresh air supply path 24 extending from the inside of the intake duct 15 upstream of the throttle valve 19 to the inside of the crankcase 2 for ventilating the inside of the crankcase 2.

On the other hand, in FIG. 1, 30 shows an electronic control unit for controlling operation of the engine. As shown in FIG. 1, the electronic control unit 30 is comprised of a digital computer provided with a storage device 32, that is, a memory 32, a CPU (microprocessor) 33, input port 34, and output port 35, which are connected with each other by a bidirectional bus 31. As shown in FIG. 1, at the inside of the surge tank 13, a pressure sensor 25 is arranged for detecting the pressure of the inside of the surge tank 13. At the throttle valve 19, a throttle valve opening degree sensor 26 is attached for detecting the opening degree of the throttle valve 19. Further, at the air cleaner 17, an atmospheric pressure sensor 27 and atmospheric temperature sensor 28 are arranged.

The output signals of these pressure sensor 25, throttle valve opening degree sensor 26, atmospheric pressure sensor 27, atmospheric temperature sensor 28, and intake air amount detector 16 are input to the input port 34 through the corresponding AD converters 36. Further, as shown in FIG. 1, at the accelerator pedal 40, a load sensor 41 generating an output voltage proportional to the amount of depression of the accelerator pedal 40 is connected. The output voltage of the load sensor 41 is input through the corresponding AD converter 36 to the input port 34. Furthermore, at the input port 34, a crank angle sensor 42 generating an output pulse each time the crankshaft rotates by for example 30° is connected. Inside the CPU 33, the engine speed is calculated based on the output signal of the crank angle sensor 42. On the other hand, the output port 35 is connected through a corresponding drive circuit 37 to the fuel injectors 14 and the actuator of throttle valve 19.

If the engine is operated, part of the combustion gas inside the combustion chambers 6 passes through the clearances of the piston rings of the pistons 5 to leak to the inside of the crankcase 2. The gas leaking to the inside of the crankcase 2 remains as blow-by gas inside the crankcase 2. The blow-by gas remaining inside the crankcase 2 is fed to the inside of the intake duct 15 downstream of the throttle valve 19 through the blow-by gas feed path 20 due to the negative pressure generated inside the intake duct 15 downstream of the throttle valve 19, then is fed through the surge tank 13, the intake branch pipes 12, the intake ports 9, and the intake valves 8 to the inside of the combustion chambers 6. The combustibles in the blow-by gas fed to the insides of the combustion chambers 6 are made to burn in the combustion chambers 6 together with the fuel injected from the fuel injectors 14.

Figure 2A:
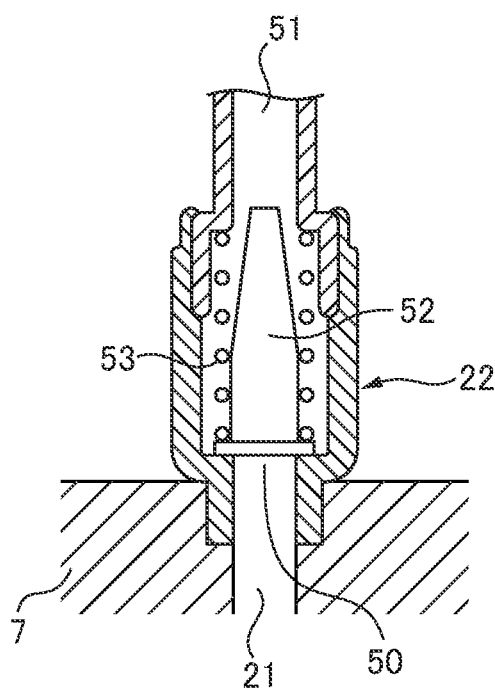
FIG. 2A and FIG. 2B are side cross-sectional views of a PCV valve.
Figure 2B:
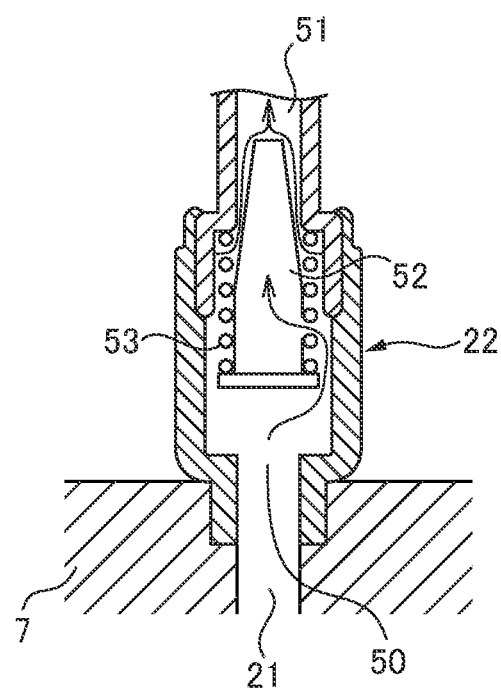

In this case, the amount of blow-by gas fed through the blow-by gas feed path 20 to the inside of the intake duct 15 downstream of the throttle valve 19 is controlled by the PCV valve 22 arranged inside the blow-by gas feed path 20. Therefore, next, referring to FIG. 2A and FIG. 2B, the operation of this PCV valve 22 will be simply explained. As shown in FIG. 2A and FIG. 2B, the PCV valve 22 is comprised of a blow-by gas inflow port 50 communicating with the inside of the crankcase 2 through the blow-by gas passage 21, a blow-by gas outflow port 51 communicating with the inside of the intake duct 15 downstream of the throttle valve 19 through the blow-by gas passage 23, a valve element 52 controlling the opening and closing of the blow-by gas inflow port 50 and controlling the flow area of the blow-by gas outflow port 51, and a compression spring 53 biasing the valve element 52 toward the blow-by gas inflow port 50.

At the time of stopping operation of the engine, as shown in FIG. 2A, due to the spring force of the compression spring 53, the valve element 52 closes the blow-by gas inflow port 50. On the other hand, if operation of the engine is started up and the negative pressure, i.e, vacuum is generated inside the intake duct 15 downstream of the throttle valve 19, that is, if the negative pressure is generated inside of the intake passage downstream of the throttle valve 19, as shown in FIG. 2B, the valve element 52 rises against the spring force of the compression spring 53 due to the pressure difference between the pressure inside the crankcase 2 and the pressure inside the intake passage downstream of the throttle valve 19. As a result, the valve element 52 opens the blow-by gas inflow port 50. Due to this, as shown by the arrow in FIG. 2B, the blow-by gas flowing in from the blow-by gas inflow port 50 passes through the blow-by gas outflow port 51 and is fed into the blow-by gas passage 23, then is fed to the inside of the intake passage downstream of the throttle valve 19.

Figure 3A:
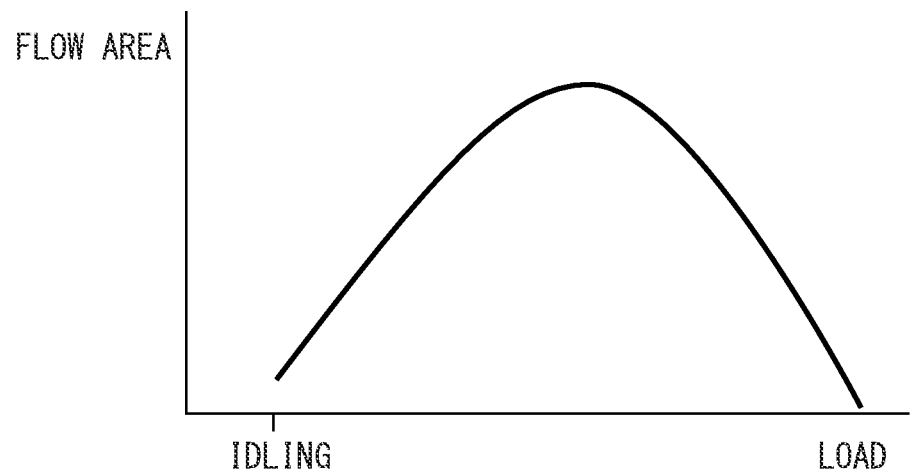
FIG. 3A and FIG. 3B are views respectively showing changes in the flow area of the PCV valve and changes in the intake pressure Pm at normal times.

In this case, the larger the negative pressure generated inside of the intake passage downstream of the throttle valve 19, the larger the amount of rise of the valve element 52. Therefore, as will be understood from FIG. 2B, the larger the negative pressure generated inside of the intake passage downstream of the throttle valve 19, the smaller the flow area of the blow-by gas outflow port 51. FIG. 3A shows the relationship between the flow area of the blow-by gas outflow port 51 and the engine load when maintaining the engine speed at a certain fixed speed (except during idling) when the PCV valve 22 is operating normally. As shown in FIG. 3A, if the engine load is lowered from the high load operating state and the negative pressure generated at the inside of the intake passage downstream of the throttle valve 19 becomes larger, the flow area of the blow-by gas outflow port 51 peaks. If the engine load is further lowered and the negative pressure generated at the inside of the intake passage downstream of the throttle valve 19 becomes further larger, the flow area of the blow-by gas outflow port 51 falls the further smaller the engine load becomes.

Note that, when the PCV valve 22 opens the blow-by gas inflow port 50, the effect of the negative pressure generated inside of the intake passage downstream of the throttle valve 19 is felt and the pressure inside of the crankcase 2 falls somewhat from the atmospheric pressure. In this case, the pressure inside of the crankcase 2 fluctuates due to reciprocating motion of the pistons 5 and, further, fluctuates due to the amount of gas leaking from the combustion chambers 6 to the inside of the crankcase 2, so sometimes also temporarily becomes somewhat higher than atmospheric pressure. Whatever the case, during engine operation, the blow-by gas inside the crankcase 2 is continuously fed to the inside of the intake passage downstream of the throttle valve 19. Note that, when a large negative pressure is generated inside the crankcase 2 due to pressure fluctuation inside the crankcase 2, fresh air is supplied to the inside of the crankcase 2 through the fresh air supply path 24 whereby a ventilation action is realized inside the crankcase 2.

Now then, when there is no abnormality at all in the blow-by gas feed path 20, the blow-by gas inside the crankcase 2 is made to burn in the combustion chambers 6. However, if an abnormality occurs in the blow-by gas feed path 20, leakage of blow-by gas into the atmosphere and other various problems arise. For example, for the blow-by gas passage 23, usually a hose called a "PVC hose" connecting the PCV valve 22 and intake duct 15 is used. In this case, if this PVC hose detaches from the connecting part with the PCV valve 22 or the connecting part with the inside of the intake duct 15 or a hole forms in the PVC hose, the atmospheric pressure acts on the blow-by gas outflow port 51 and as a result the valve element 52 closes the blow-by gas inflow port 50.

In this regard, however, if the valve element 52 closes the blow-by gas inflow port 50, when the engine is being operated, the amount of blow-by gas inside the crankcase 2 continues to increase and therefore the pressure inside the crankcase 2 gradually becomes higher. As a result, when, due to fluctuation of pressure inside the crankcase 2, the pressure inside the crankcase 2 becomes higher than the atmospheric pressure, the valve element 52 opens the blow-by gas inflow port 50. Due to this, the blow-by gas inside of the crankcase 2 leaks into the atmosphere through the PCV valve 22. That is, the abnormality of leakage of blow-by gas occurs.

On the other hand, if the abnormality of stuck closing resulting from the valve element 52 continuing to close the blow-by gas inflow port 50 occurs, blow-by gas continues to remain inside the crankcase 2 and as a result the problem arises that the strongly acidic water vapor contained in the blow-by gas causes deterioration of the engine oil or formation of rust inside of the engine. As opposed to this, if the abnormality of stuck opening resulting from the valve element 52 continuing to open the blow-by gas inflow port 50 occurs, blow-by gas continues to flow out from inside of the crankcase 2. As a result, evaporated oil 3 from inside of the crankcase 2 continues to flow out from inside the crankcase 2, so the problem arises of the amount of consumption of oil increasing.

In this way, if the PVC hose detaches from connecting part with the PCV valve 22 or the connecting part with the inside of the intake duct 15 or a hole is formed in the PVC hose, the abnormality of leakage of blow-by gas occurs. If the abnormality of stuck closing of the valve element 52 occurs or the abnormality of stuck opening of the valve element 52 occurs, the problems such as explained above occur. Therefore, it is necessary to detect if the PVC hose detaches from the connecting part with the PCV valve 22 or the connecting part with the inside of the intake duct 15 or a hole forms in the PVC hose, if the abnormality of stuck closing of the valve element 52 occurs, or if the abnormality of stuck opening of the valve element 52 occurs.

In this regard, if designating the intake pressure inside the surge tank 13, that is, the intake pressure PM at the inside of the intake passage downstream of the throttle valve 19, as Pm, this intake pressure Pm is a pressure at which the total amount of the amount of intake air and the amount of blow-by gas flowing inside the surge tank 13 becomes the same as the amount of gas flowing into the combustion chambers 6. This intake pressure Pm is determined unambiguously correspondingly to the total amount of the amount of intake air and the amount of blow-by gas flowing inside the surge tank 13 or the amount of gas flowing into the combustion chambers 6 if the total amount of the amount of intake air and the amount of blow-by gas flowing inside the surge tank 13 or the amount of gas flowing into the combustion chambers 6 is determined. In this case, the amount of gas flowing into the combustion chambers 6 is determined correspondingly to the engine load and engine speed if the engine load and engine speed are determined. Therefore, this intake pressure Pm is determined corresponding to the engine load and engine speed if the engine load and engine speed are determined. That is, the intake pressure Pm is determined corresponding to the engine load and engine speed if the PCV system is normal.

Figure 3B:
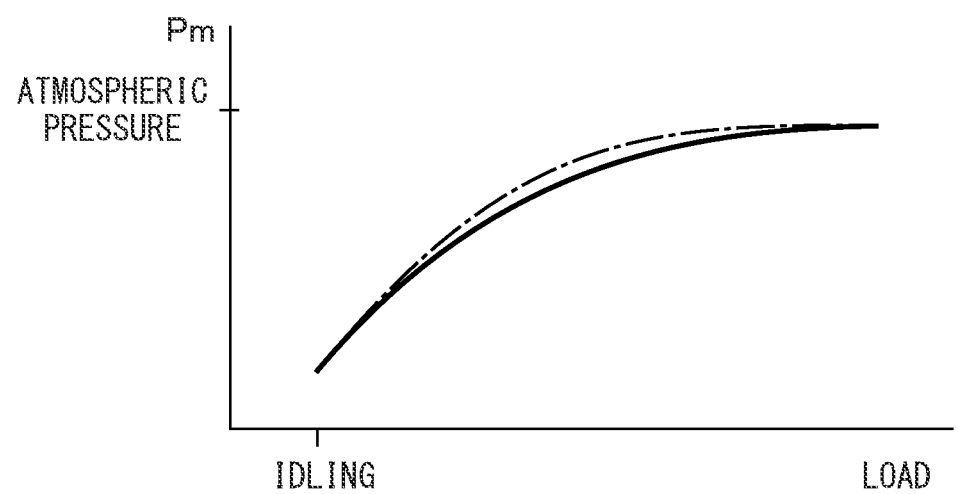

The solid line in FIG. 3B shows the relationship between the intake pressure Pm and engine load when maintaining the engine speed at a certain fixed speed (except during idling) in the same way as FIG. 3A in case where the PCV system is normal. As shown by the solid line in FIG. 3B, in this case, the intake pressure Pm falls as the engine load becomes smaller. On the other hand, the dot and dash line of FIG. 3B shows the pressure at the opening portion of the blow-by gas passage 23 opening into the inside of the intake passage downstream of the throttle valve 19. When blow-by gas is not being supplied from the opening portion of the blow-by gas passage 23 to the inside of the intake passage, the pressure of the opening portion of the blow-by gas passage 23 becomes equal to the intake pressure Pm shown by the solid line. As opposed to this, when blow-by gas is being supplied from the opening portion of the blow-by gas passage 23 to the inside of the intake passage, the pressure of the opening portion of the blow-by gas passage 23 becomes somewhat higher than the intake pressure Pm shown by the solid line. As shown in FIG. 3A, the flow area of the blow-by gas outflow port 51 becomes maximum at the time of engine medium load operation, so at this time the amount of blow-by gas supplied to the inside of the intake passage becomes maximum. Therefore, as shown in FIG. 3B, at the time of engine medium load operation, the pressure at the opening portion of the blow-by gas passage 23 becomes the highest relative to the intake pressure Pm shown by the solid line.

Figure 4A:
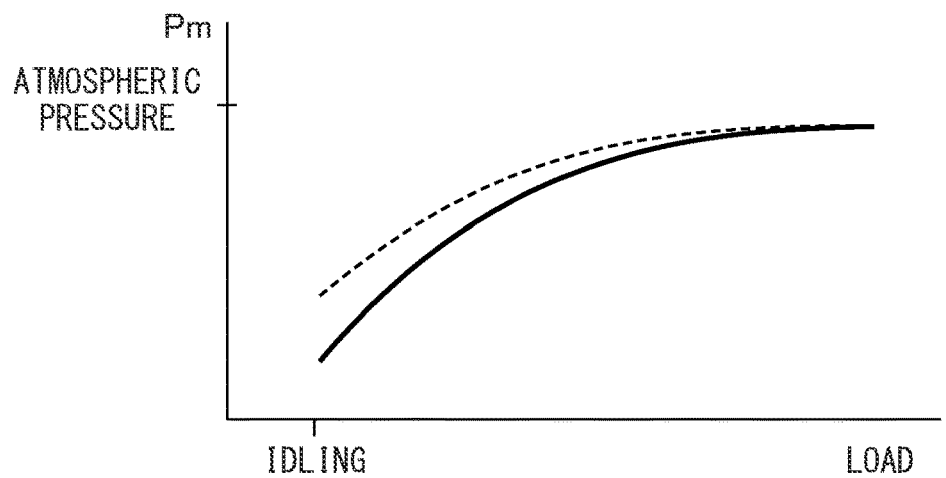
FIG. 4A, FIG. 4B, and FIG. 4C are respectively views for explaining changes in the intake pressure Pm at abnormal times.
Figure 4B:
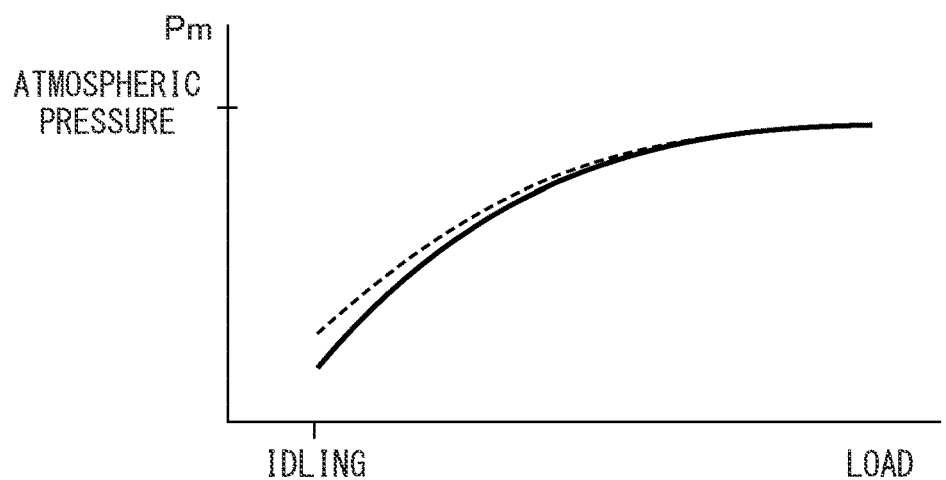
Figure 4C:
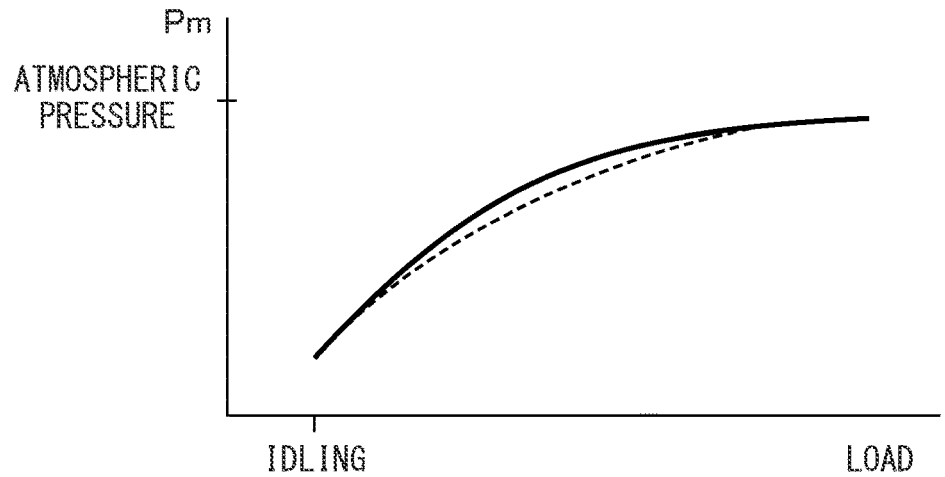

Next, the change in the intake pressure Pm when there is an abnormality in the PCV system will be explained while referring to FIG. 4A, FIG. 4B, and FIG. 4C. Note that, the solid lines in FIG. 4A, FIG. 4B, and FIG. 4C are the same as the solid line in FIG. 3B. Therefore, the solid lines in FIG. 4A, FIG. 4B, and FIG. 4C show the relation between the intake pressure Pm and the engine load when maintaining the engine speed at a certain fixed speed (except during idling) when the PCV system is normal.

The broken line of FIG. 4A shows the change in the intake pressure Pm when the PVC hose detaches from the connecting part with the PCV valve 22 or the connecting part with the inside of the intake duct 15 or a hole forms in the PVC hose. If the PVC hose detaches from the connecting part with the PCV valve 22 or the connecting part with the inside of the intake duct 15 or a hole forms in the PVC hose, the opening portion of the blow-by gas passage 23 opening into the inside of the intake duct 15 becomes atmospheric pressure. As a result, the intake pressure Pm rises and, as shown by the broken line of FIG. 4A, the intake pressure Pm becomes higher than the intake pressure Pm at normal times shown by the solid line. Therefore, it becomes possible to judge if the abnormality of detachment of the PVC hose or the abnormality of formation of a hole in the PVC hose occurs from the change of the intake pressure Pm.

Note that, the intake pressure Pm at normal times shown by the solid line becomes higher the higher the engine load. If the intake pressure Pm at normal times becomes higher, even if the opening portion of the blow-by gas passage 23 opening into the inside of the intake duct 15 becomes atmospheric pressure, the intake pressure Pm does not change much at all. As opposed to this, if the engine load becomes lower and the intake pressure Pm at normal times becomes lower, as shown by the broken line of FIG. 4A, when the opening portion of the blow-by gas passage 23 opening into the inside of the intake duct 15 becomes atmospheric pressure, the intake pressure Pm greatly changes. Therefore, when the engine load is low, it is possible to more reliably judge if the abnormality of detachment of the PVC hose occurs or if the abnormality of formation of a hole in the PVC hose occurs. Further, these judgments of abnormality can be most reliably performed at the time of steady operation where the intake pressure Pm is stable. Therefore, in the embodiments according to the present invention, it is judged if the abnormality of detachment of the PVC hose occurs or if the abnormality of formation of a hole in the PVC hose occurs, that is, if the abnormality of leakage of blow-by gas occurs, at the time of engine low load steady operation. Specifically, it is judged if the abnormality of detachment of the PVC hose occurs or if the abnormality of formation of a hole in the PVC hose occurs, that is, if the abnormality of leakage of blow-by gas occurs, when idling operation has continued for a fixed time or more.

On the other hand, the broken line of FIG. 4B shows the change in intake pressure Pm when the abnormality of stuck opening of the PCV valve 22 occurs. If the abnormality of stuck opening of the PCV valve 22 occurs, both at the time of engine low load operation or the time of engine high load operation where, if at normal times, the flow area of the blow-by gas outflow port 51 becomes smaller, the flow area of the blow-by gas outflow port 51 is maintained large as is. Therefore, at this time, if the intake pressure Pm was maintained at the same intake pressure as normal times, at the time of engine low load operation and the time of engine high load operation, the total amount of the amount of intake air and amount of blow-by gas flowing into the surge tank 13 increases compared with normal times. However, so long as the engine load and engine speed are the same, the total amount of the amount of intake air and amount of blow-by gas flowing into the surge tank 13 will not change. Therefore, when the abnormality of stuck opening of the PCV valve 22 occurs, in actuality, the intake pressure Pm, as shown by the broken line of FIG. 4B, rises at the time of engine low load operation compared with normal times so that the total amount of the amount of intake air and amount of blow-by gas flowing into the surge tank 13 becomes the same as normal times. Therefore, it becomes possible to judge if the abnormality of stuck opening of the PCV valve 22 occurs from the change of the intake pressure Pm.

Note that, the intake pressure Pm at normal times shown by the solid line becomes higher the higher the engine load. If the intake pressure Pm at normal times becomes higher, even if the flow area of the blow-by gas outflow port 51 is maintained large as is, the intake pressure Pm no longer changes much at all. As opposed to this, if the engine load becomes lower and the intake pressure Pm at normal times becomes lower, as shown by the broken line in FIG. 4B, when the flow area of the blow-by gas outflow port 51 is maintained large as is, the intake pressure Pm greatly changes. Therefore, when the engine load is low, it is possible to judge if the abnormality of stuck opening of the PCV valve 22 occurs. Further, at the time of steady operation where the intake pressure Pm is stable, it is possible to most reliably judge abnormalities. Therefore, in the embodiments according to the present invention, at the time of engine low load steady operation, it is judged that the abnormality of stuck opening of the PCV valve 22 occurs. Specifically, when idling operation has continued for a fixed time or more, it is judged that the abnormality of stuck opening of the PCV valve 22 occurs.

On the other hand, the broken line of FIG. 4C shows the change in intake pressure Pm when the abnormality of stuck closing of the PCV valve 22 occurs. If the abnormality of stuck closing of PCV valve 22 occurs, even at the time of engine medium load operation where, if at normal times, the flow area of the blow-by gas outflow port 51 becomes large, the PCV valve 22 is maintained in the closed state. Therefore, at this time, if the intake pressure Pm was maintained at the same intake pressure as normal times, at the time of engine medium load operation, the total amount of the amount of intake air and amount of blow-by gas flowing into the surge tank 13 decreases compared with normal times. However, as explained above, so long as the engine load and engine speed are the same, the total amount of the amount of intake air and amount of blow-by gas flowing into the surge tank 13 will not change. Therefore, when the abnormality of stuck closing of the PCV valve 22 occurs, in actuality, the intake pressure Pm, as shown by the broken line of FIG. 4C, falls at the time of engine medium load operation compared with normal times so that the total amount of the amount of intake air and amount of blow-by gas flowing into the surge tank 13 becomes the same as normal times. Therefore, it becomes possible to judge from the change of the intake pressure Pm if the abnormality of stuck closing of the PCV valve 22 occurs.

Note that, at the time of engine low load operation or at the time of engine high load operation, even at normal times, the flow area of the blow-by gas outflow port 51 is small, so as shown in FIG. 4C, both at normal times and when the abnormality of stuck closing of the PCV valve 22 occurs, the intake pressure Pm does not change much at all. As opposed to this, at the time of engine medium load operation, if the abnormality of stuck closing of the PCV valve 22 occurs, as shown by the broken line of FIG. 4C, the intake pressure Pm greatly falls compared with normal times. Therefore, at the time of engine medium load operation, it is possible to judge if the abnormality of stuck closing of the PCV valve 22 occurs. Further, at the time of steady operation where the intake pressure Pm is stable, it is possible to most reliably judge abnormalities. Therefore, in the embodiments according to the present invention, at the time of engine medium load steady operation, it is judged that the abnormality of stuck closing of the PCV valve 22 occurs. Specifically, when engine medium load operation has continued for a fixed time or more, it is judged that the abnormality of stuck closing of the PCV valve 22 occurs.

In this way, when the abnormality of leakage of blow-by gas, the abnormality of stuck closing of the valve element 52, or the abnormality of stuck opening of the valve element 52 occurs, it is possible to judge the abnormality of leakage of blow-by gas, the abnormality of stuck closing of the valve element 52, or the abnormality of stuck opening of the valve element 52 from the change of the intake pressure Pm. However, in this case, as will be understood by the broken line of FIG. 4A and the broken line of FIG. 4B, both when the abnormality of leakage of blow-by gas occurs and when the abnormality of stuck opening of the PCV valve 22 occurs, the intake pressure Pm changes in similar ways, so it is not easy to accurately judge if leakage of blow-by gas occurs from the change of the intake pressure Pm. Therefore, in the present invention, a neural network is used to accurately judge if an abnormality occurs in the blow-by gas feed path 20 from the change of the intake pressure Pm.

SUMMARY OF NEURAL NETWORK

Figure 5:
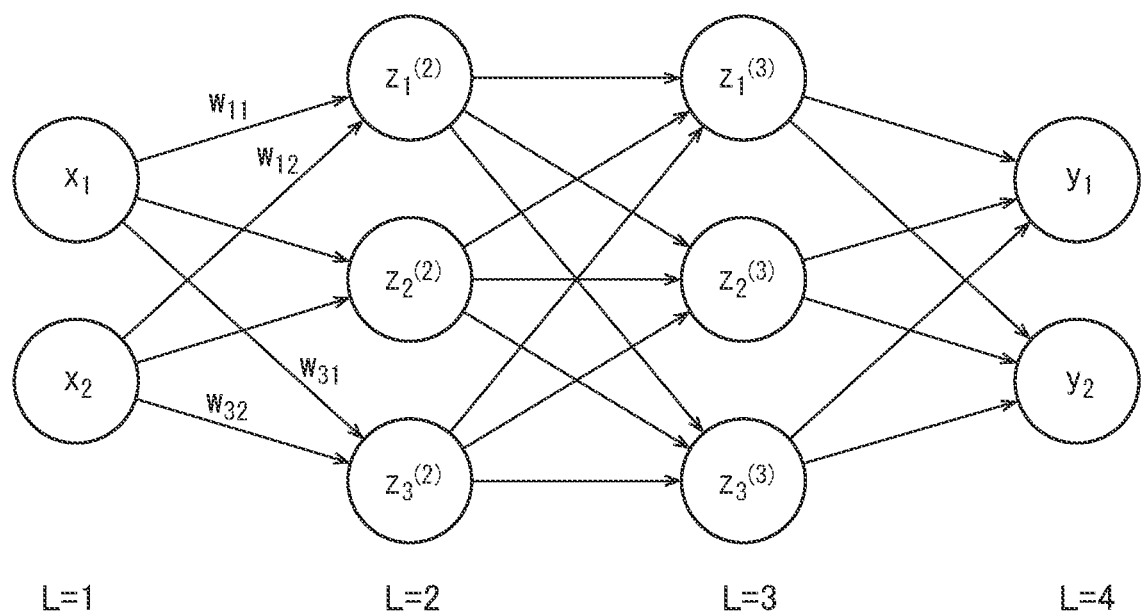
FIG. 5 is a view showing one example of a neural network.

As explained above, in the embodiment according to the present invention, a neural network is used to judge whether or not an abnormality occurs in the blow-by gas feed path 20. Therefore, first, a neural network will be briefly explained. FIG. 5 shows a simple neural network. The circle marks in FIG. 5 show artificial neurons. In the neural network, these artificial neurons are usually called "nodes" or "units" (in the present application, they are called "nodes"). In FIG. 5, L=1 shows an input layer, L=2 and L=3 show hidden layers, and L=4 shows an output layer. Further, in FIG. 5, $x_1$ and $x_2$ show output values from nodes of the input layer (L=1), $y_1$ and $y_2$ show output values from the nodes of the output layer (L=4), $z^{(2)}_1$, $z^{(2)}_2$, and $z^{(2)}_3$ show output values from the nodes of one hidden layer (L=2), and $z^{(3)}_1$, $z^{(3)}_2$, and $z^{(3)}_3$ show output values from the nodes of another hidden layer (L=3). Note that, the numbers of hidden layers may be made one or any other numbers, while the number of nodes of the input layer and the numbers of nodes of the hidden layers may also be made any numbers. Further, the number of nodes of the output layer may be made a single node, but may also be made a plurality of nodes.

At the nodes of the input layer, the inputs are output as they are. On the other hand, the output values $x_1$ and $x_2$ of the nodes of the input layer are input at the nodes of the hidden layer (L=2), while the respectively corresponding weights "w" and biases "b" are used to calculate sum input values "u" at the nodes of the hidden layer (L=2). For example, a sum input value $u_k$ calculated at a node shown by $z^{(2)}_k$ (k=1, 2, 3) of the hidden layer (L=2) in FIG. 5 becomes as shown in the following equation:

$$U_k = \sum_{m=1}^{n} (x_m \cdot w_{km}) + b_k$$

Next, this sum input value $u_k$ is converted by an activation function "f" and is output from a node shown by $z^{(2)}_3$ of the hidden layer (L=2) as an output value $z^{(2)}_k$ (=f($u_k$)). On the other hand, the nodes of the hidden layer (L=3) receive as input the output values $z^{(2)}_1$, $z^{(2)}_2$, and $z^{(2)}_3$ of the nodes of the hidden layer (L=2). At the nodes of the hidden layer (L=3), the respectively corresponding weights "w" and biases "b" are used to calculate the sum input values "u" (Σz·w·b). The sum input values "u" are similarly converted by an activation function and output from the nodes of the hidden layer (L=3) as the output values $z^{(3)}_1$, $z^{(3)}_2$, and $z^{(3)}_3$. As this activation function, for example, a Sigmoid function σ is used.

On the other hand, at the nodes of the output layer (L=4), the output values $z^{(3)}_1$, $z^{(3)}_2$, and $z^{(3)}_3$ of the nodes of the hidden layer (L=3) are input. At the nodes of the output layer, the respectively corresponding weights "w" and biases "b" are used to calculate the sum input values "u" (Σz·w+b) or just the respectively corresponding weights "w" are used to calculate the sum input values "u" (Σz·w). In the embodiment according to the present invention, at the nodes of the output layer, an identity function is used, therefore, from the nodes of the output layer, the sum input values "u" calculated at the nodes of the output layer are output as they are as the output values "y".

Learning in Neural Network

Now then, if designating the training data showing the truth values of the output values "y" of the neural network as $y_t$, the weights "w" and biases "b" in the neural network are learned using the error backpropagation algorithm so that the difference between the output values "y" and the training data $y_t$ becomes smaller. This error backpropagation algorithm is known. Therefore, the error backpropagation algorithm will be explained simply below in its outlines. Note that, a bias "b" is one kind of weight "w", so below, a bias "b" will be also be included in what is referred to as a weight "w". Now then, in the neural network such as shown in FIG. 5, if the weights at the input values $u^{(L)}$ to the nodes of the layers of L=2, L=3, or L=4 are expressed by $w^{(L)}$, the differential due to the weights $w^{(L)}$ of the error function E, that is, the slope $\partial E/\partial w^{(L)}$, can be rewritten as shown in the following equation:

$$\partial E/\partial w^{(L)} = (\partial E/\partial u^{(L)})(\partial u^{(L)}/\partial w^{(L)}) \quad (1)$$

where, $z^{(L-1)} \cdot \partial w^{(L)} = \partial u^{(L)}$, so if $(\partial E/\partial u^{(L)})\delta^{(L)}$, the above equation (1) can be shown by the following equation:

$$\partial E/\partial w^{(L)} = \delta^{(L)} \cdot z^{(L-1)} \quad (2)$$

where, if $u^{(L)}$ fluctuates, fluctuation of the error function E is caused through the change in the sum input value $u^{(L+1)}$ of the following layer, so $\delta^{(L)}$ can be expressed by the following eauation:

$$\delta^{(L)} = (\partial E/\partial u^{(L)}) = \sum_{k=1}^{k} (\partial E/\partial u_k^{(L+1)})(\partial u_k^{(L+1)}/\partial u^{(L)}) \, (k=1,2\ldots) \quad (3)$$

where, if expressing $z^{(L)}=f(u^{(L)})$, the input value $u_k^{(L+1)}$ appearing at the right side of the above equation (3) can be expressed by the following formula:

$$\text{input value } u_k^{(L+1)} = \sum_{k=1}^{k} w_k^{(L+1)} \cdot z^{(L)} = \sum_{k=1}^{k} w_k^{(L+1)} \cdot f(u^{(L)}) \quad (4)$$

where, the first term $(\partial E/\partial u^{(L+1)})$ at the right side of the above equation (3) is $\delta^{(L+1)}$, and the second term $\partial u_k^{(L+1)}/\partial u^{(L)}$ at the right side of the above equation (3) can be expressed by the following equation:

$$\partial(w_k^{(L+1)} \cdot z^{(L)})/\partial u^{(L)} = w_k^{(L+1)} \cdot \partial f(u^{(L)})/\partial u^{(L)} = w_k^{(L+1)} \cdot f'(u^{(L)}) \quad (5)$$

Therefore, $\delta^{(L)}$ is shown by the following formula.

$$\delta^{(L)} = \sum_{k=1}^{k} w_k^{(L+1)} \cdot \delta^{(L+1)} \cdot f'(u^{(L)})$$

That is, $$\delta^{(L-1)} = \sum_{k=1}^{k} w_k^{(L)} \cdot \delta^{(L)} \cdot f'(u^{(L-1)}) \quad (6)$$

That is, if $\delta^{(L+1)}$ is found, it is possible to find $\delta^{(L)}$.

Now then, if there is a single node of the output layer (L=4), teacher data, that is, truth data $y_t$, is found for a certain input value, and the output values corresponding to this input value are "y", if the square error is used as the error function, the square error E is found by $E=\frac{1}{2}(y-y_t)^2$. In this case, at the node of the output layer (L=4), the output values "y" become $f(u^{(L)})$, therefore, in this case, the value of $\delta^{(L)}$ at the node of the output layer (L=4) becomes like in the following equation:

$$\delta^{(L)} \partial E/\partial u^{(L)} = (\partial E/\partial y)(\partial y/\partial u^{(L)}) = (y-y_t) \cdot f'(u^{(L)}) \quad (7)$$

In this case, in the regression problem, as explained above, $f(u^{(L)})$ is an identity function and $f'(u^{(L)})=1$. Therefore, this leads to $\delta^{(L)}=y-y_t$ and $\delta^{(L)}$ is found.

If $\delta^{(L)}$ is found, the above equation (6) is used to find the $\delta^{(L-1)}$ of the previous layer. The $\delta$'s of the previous layer are successively found in this way. Using these values of $\delta$'s, from the above equation (2), the differential of the error function E, that is, the slope $\partial E/\partial w^{(L)}$, is found for the weights "w". If the slope $\partial E/\partial w^{(L)}$ is found, this slope $\partial E/\partial w^{(L)}$ is used to update the weights "w" so that the value of the error function E decreases. That is, the weights "w" are learned.

On the other hand, in the classification problem, at the time of learning, the output values $y_1, y_2 \ldots$ from the output layer (L=4) are input to a softmax layer. If defining the output values from the softmax layer as $y_1, y_2 \ldots$ and the corresponding truth labels as $y_{t1}, y_{t2} \ldots$ as the error function E, the following cross entropy error E is used.

$$\text{Cross entropy error } E = \quad (8)$$
$$-\sum_{k=1}^{n} y_{tk} \log y_k' \left( \text{"n" is number of nodes of output layer} \right)$$

In this case as well, the values of $\delta^{(L)}$ at the nodes of the output layer (L=4) become $\delta^{(L)}=y_k-y_{tk}$ (k=1, 2 ... n). From the values of these $\delta^{(L)}$, the $\delta^{(L-1)}$ of the previous layers are found using the above equation (6).

Embodiments of Present Invention

Now then, in the first embodiment according to the present invention, the intake pressure Pm at the inside of the intake passage downstream of the throttle valve 19 is detected by the pressure sensor 25 arranged inside the surge tank 13. Using this intake pressure Pm, it is judged whether the abnormality of leakage of blow-by gas occurs, if the abnormality of stuck opening of the valve element 52 occurs, or if the abnormality of stuck closing of the valve element 52 occurs.

On the other hand, in the second embodiment according to the present invention, the estimated value of the intake pressure Pm in the intake passage downstream of the throttle valve 19 is calculated based on the amount of intake air detected by the intake air amount detector 16, the atmospheric pressure, the atmospheric temperature, and the opening degree of the throttle valve 19. This estimated value of the intake pressure Pm is used to judge if the abnormality of leakage of blow-by gas occurs, the abnormality of stuck opening of the valve element 52 occurs, and the abnormality of stuck closing of the valve element 52 occurs. In this second embodiment, there is the advantage that a pressure sensor 25 for detecting the intake pressure Pm is not required.

Figure 6:
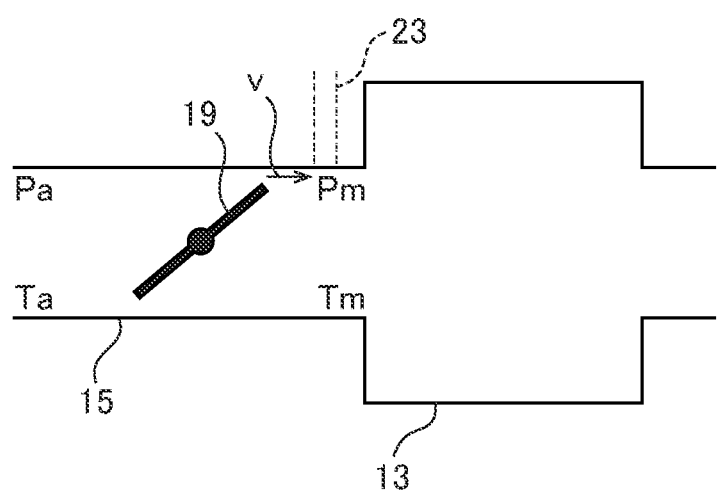
FIG. 6 is a view for explaining a method of calculation of an amount of intake air running through a throttle valve.

Next, referring to FIG. 6 to FIG. 9, the method for calculating the estimated value of the intake pressure Pm will be explained. FIG. 6 illustrates the surge tank 13, the intake duct 15, and the throttle valve 19 shown in FIG. 1. Further, FIG. 6 shows the blow-by gas passage 23 shown in FIG. 1 by a broken line. Note that, first, the method for calculation of the amount of intake air passing through the throttle valve 19 will be explained. In FIG. 6, Pa shows the pressure inside the intake passage upstream of the throttle valve 19, Ta shows the temperature inside the intake passage upstream of the throttle valve 19, Pm shows the pressure inside the intake passage downstream of the throttle valve 19, that is, the intake pressure, and Tm shows the temperature inside the intake passage downstream of the throttle valve 19. In this case, if the open area of the throttle valve 19 is designated as TA, the flow coefficient is designated as "μ", R is the gas constant, and κ the specific heat ratio, the amount of intake air mt passing through the throttle valve 19 becomes as shown by the following equation:

$$mt = \mu \cdot TA \cdot \frac{Pa}{\sqrt{R \cdot Ta}} \cdot \Phi\left(\frac{Pm}{Pa}\right) \quad (9)$$

$$\Phi\left(\frac{P_m}{P_a}\right) = \quad (10)$$

$$\begin{cases} \sqrt{\frac{\kappa}{2 \cdot (\kappa+1)}} & \frac{P_m}{P_a} \leq \frac{1}{\kappa+1} = 0.4167 \\ \sqrt{\left\{\frac{\kappa-1}{2\cdot\kappa}\cdot\left(1-\frac{P_m}{P_a}\right)+\frac{P_m}{P_a}\right\}\cdot\left(1-\frac{P_m}{P_a}\right)} & \frac{P_m}{P_a} > \frac{1}{\kappa+1} = 0.4167 \end{cases}$$

Figure 7A:
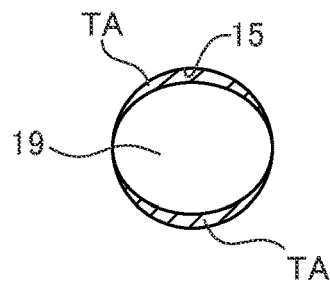
FIG. 7A and FIG. 7B are views showing open areas of the throttle valve.
Figure 7B:
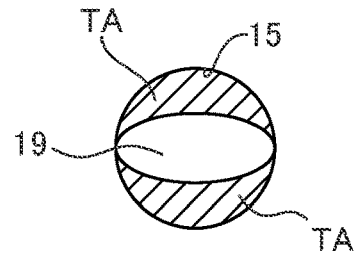

Here, the open area TA of the throttle valve 19, as shown by hatching in FIG. 7A and FIG. 7B, indicates the area surrounded by the outer circumferential edge of the throttle valve 19 and the inner circumferential surface of the intake duct 15 when viewed along the axis of the intake duct 15. This open area TA of the throttle valve 19 is stored in advance in the memory 32 as a function of the opening degree of the throttle valve 19.

Next, the method of finding the above equations (9) and (10) will be simply explained. If designating the flow rate of the intake air right after passing through the throttle valve 19 as v(m/s) and designating the density of the intake air as ρ (kg/m$^3$), the amount of intake air mt passing through the throttle valve 19 is expressed by the following equation:

$$mt = TA \cdot v \cdot \rho \quad (11)$$

On the other hand, if the energy of the intake air is conserved before and after passing through the throttle valve 19, the following equation stands for the intake air per unit mass (1 kg):

$$\tfrac{1}{2}v^2 + C_p \cdot Tm = C_p \cdot Ta \quad (12)$$

Note that, at the above equation (12), $\tfrac{1}{2}\cdot v^2$ and $C_P \cdot Tm$ respectively show the kinetic energy and enthalpy of the intake air right after passing through the throttle valve 19, while $C_P \cdot Ta$ shows the enthalpy of the intake air before passing through the throttle valve 19. Note that, the flow rate of the intake air before passing through the throttle valve 19 is made zero. Further, in the above equation (12), $C_P$ shows the constant pressure specific heat of the intake air.

On the other hand, the amount of motion of the intake air is conserved before and after passing through the throttle valve 19, so the following equation stands.

$$(mt \cdot \Delta t) \cdot v = TA \cdot (Pa - Pm) \cdot \Delta t \quad (13)$$

Note that, at the left side of the above equation (13), (mt·Δt) shows the mass of the intake air accelerated per unit time Δt, while "v" shows the amount of change of the speed of the intake air (flow rate of intake air before passing through throttle valve 19 is made zero). On the other hand, the right side of the above equation (13) shows the impulse. From the above equations (11), (12), and (13) and the equations of state P=ρ·R·T and $C_p$=R·k/(k−1), the above equations (9) and (10) showing the amount of intake air mt passing through the throttle valve 19 are found. As will be understood from the above equations (9) and (10), the amount of intake air mt passing through the throttle valve 19 becomes a function of the pressure Pa inside the intake passage upstream of the throttle valve 19, the temperature Ta at the inside of the intake passage upstream of the throttle valve 19, the pressure Pm inside the intake passage downstream of the throttle valve 19, and the open area TA of the throttle valve 19.

Figure 8:
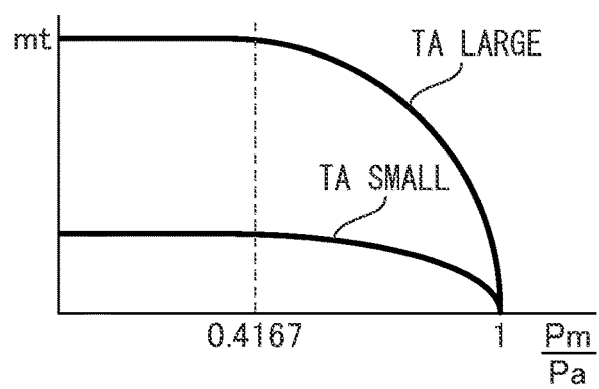
FIG. 8 is a view showing an amount of intake air passing through the throttle valve.

FIG. 8 shows the relation between the amount of intake air mt passing through the throttle valve 19 and the pressure ratio (Pm/Pa) when the pressure Pa inside the intake passage upstream of the throttle valve 19 and the temperature Ta at the inside of the intake passage upstream of the throttle valve 19 are maintained at certain fixed values. Note that, FIG. 8 shows the change in the amount of intake air mt when the open area TA of the throttle valve 19 is large and the change in the amount of intake air mt when the open area TA of the throttle valve 19 is small. As shown in FIG. 8, when the pressure ratio (Pm/Pa) is 1/(κ+1) (=0.4167) or more, as the pressure ratio (Pm/Pa) becomes higher, the amount of intake air mt decreases. When the pressure ratio (Pm/Pa) is 1/(κ+1) (=0.4167) or less, the amount of intake air mt becomes constant regardless of the pressure ratio (Pm/Pa). Note that, at the time of normal vehicle driving, the pressure ratio (Pm/Pa) becomes 1/(κ+1) (=0.4167) or more.

Figure 9:
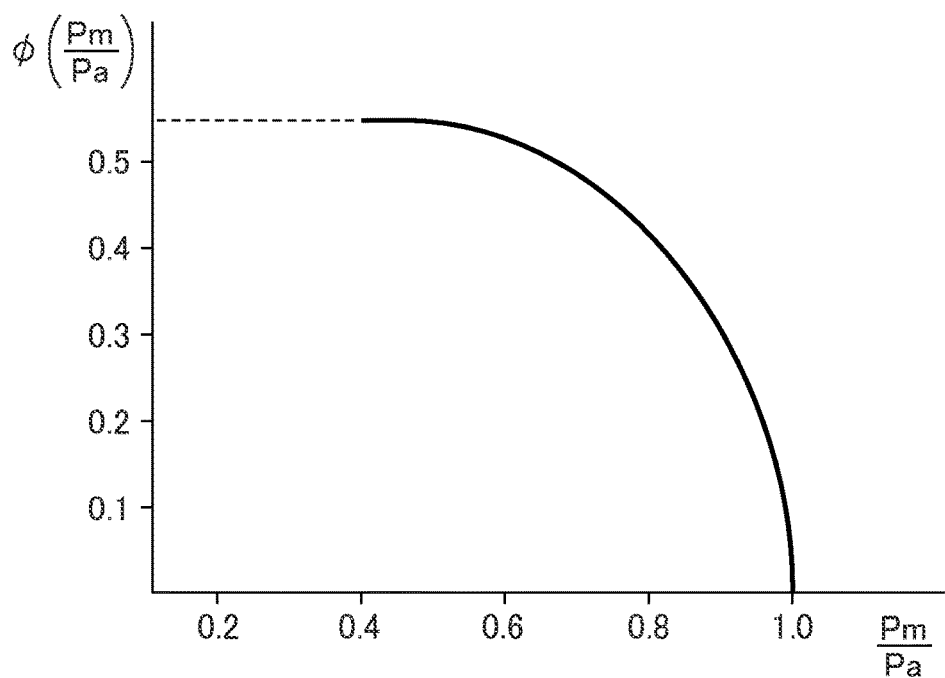
FIG. 9 is a view showing the relationship of Φ (Pm/Pa) and Pm/Pa.

FIG. 9 shows the relation between Φ (Pm/Pa) and the pressure ratio (Pm/Pa) in the above equations (9) and (10). As will be understood from the above equation (9), if the amount of intake air mt passing through the throttle valve 19, the pressure Pa inside the intake passage upstream of the throttle valve 19, the temperature Ta at the inside of the intake passage upstream of the throttle valve 19, and the open area TA of the throttle valve 19 are known, Φ (Pm/Pa) is known. If Φ (Pm/Pa) is known, from the relationship shown in FIG. 9, the pressure Pm inside the intake passage downstream of the throttle valve 19, that is, the intake pressure Pm, is known. In this case, the amount of intake air mt passing through the throttle valve 19 becomes equal to the amount of intake air detected by the intake air detector 16, therefore if the amount of intake air mt detected by the intake air amount detector 16, the pressure Pa inside the intake passage upstream of the throttle valve 19, the temperature Ta at the inside of the intake passage upstream of the throttle valve 19, and the open area TA of the throttle valve 19 are known, the pressure Pm inside the intake passage downstream of the throttle valve 19, that is, the intake pressure Pm, becomes known from the relationship shown in FIG. 9.

Note that, in the second embodiment, the relationship between Φ (Pm/Pa) and the pressure ratio (Pm/Pa) shown in FIG. 9 is stored in advance inside the memory 32. Further, as explained above, the open area TA of the throttle valve 19 is stored as a function of the opening degree of the throttle valve 19 in advance inside the memory 32. Therefore, if the opening degree of the throttle valve 19 is known, the open area TA of the throttle valve 19 is known, Therefore, in this second embodiment, the amount of intake air mt, the pressure Pa inside the intake passage upstream of the throttle valve 19, the temperature Ta at the inside of the intake passage upstream of the throttle valve 19, and the open area TA of the throttle valve 19 are found based on the results of detection by the intake air amount detector 16, the atmospheric pressure sensor 27, the atmospheric temperature sensor 28, and the throttle valve opening degree sensor 26, and using the relationship shown in FIG. 9, the pressure Pm inside the intake passage downstream of the throttle valve 19, that is, the estimated value of the intake pressure Pm, is found.

Now then, as explained above, the pressure Pm inside of the intake passage downstream of the throttle valve 19, that is, the intake pressure Pm, is determined in accordance with the engine load and engine speed when the PCV system is normal. As opposed to this, when the abnormality of leakage of blow-by gas occurs or when the abnormality of stuck opening of the PCV valve 22 occurs, as explained while referring to FIG. 4A and FIG. 4B, at the time of engine low load operation, the intake pressure Pm changes from the intake pressure Pm at normal times while when the abnormality of stuck closing of the PCV valve 22 occurs, as explained while referring to FIG. 4C, at the time of engine medium load operation, the intake pressure Pm changes from the intake pressure Pm at normal times. Therefore, as explained above, in the embodiments according to the present invention, at the time of engine low load steady operation, it is judged if the abnormality of leakage of blow-by gas occurs and if the abnormality of stuck opening of the PCV valve 22 occurs, while at the time of engine medium load steady operation, it is judged if the abnormality of stuck closing of the PCV valve 22 occurs.

In this case, if possible to obtain an accurate grasp of the change in this intake pressure Pm, it would be possible to accurately judge if the abnormality of leakage of blow-by gas occurs, if the abnormality of stuck opening of the PCV valve 22 occurs, and if the abnormality of stuck closing of the PCV valve 22 occurs. Therefore, in the embodiments according to the present invention, to accurately judge the occurrence of the abnormality of leakage of blow-by gas and the occurrence of the abnormality of stuck opening of the PCV valve 22, a first model estimating judgment of abnormalities able to accurately estimate if the abnormality of leakage of blow-by gas occurs or the abnormality of stuck opening of the PCV valve 22 occurs using a first neural network at the time of engine low load steady operation is prepared. Furthermore, to accurately judge the occurrence of the abnormality of stuck closing of the PCV valve 22, a second model estimating judgment of abnormalities able to accurately estimate if the abnormality of stuck closing of the PCV valve 22 occurs using a second neural network at the time of engine medium load steady operation is prepared.

Figure 10:
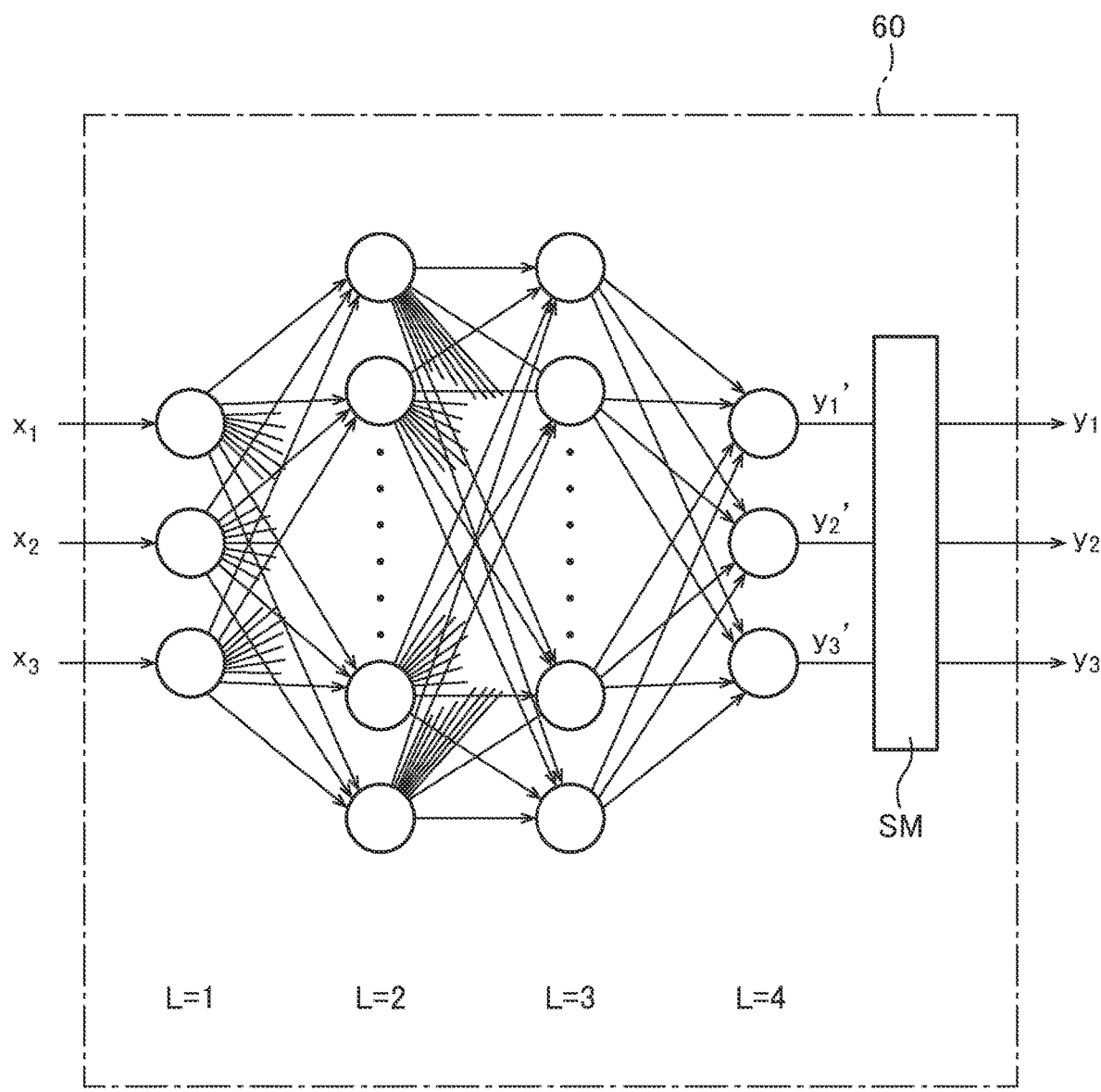
FIG. 10 is a view showing a first neural network used in an embodiment according to the present invention.

Next, one embodiment of the first neural network used for preparing the first model estimating judgment of abnormalities able to accurately estimate if the abnormality of leakage of blow-by gas occurs or the abnormality of stuck opening of the PCV valve 22 occurs at the time of engine low load steady operation will be explained while referring to FIG. 10. Referring to FIG. 10, in this first neural network 60 as well, in the same way as the neural network shown in FIG. 5, L=1 shows the input layer, L=2 and L=3 show hidden layers, and L=4 shows the output layer. In this neural network 60, as shown in FIG. 10, the input layer (L=1) is comprised of three nodes. Three input values $x_1$, $x_2$, $x_3$ are input to the nodes of the input layer (L=1).

On the other hand, FIG. 10 describes the hidden layer (L=2) and hidden layer (L=3), but the number of the hidden layers may also be one or any other number. Further, the numbers of the nodes of these hidden layers may also be made any numbers. Further, in this embodiment, the number of nodes of the output layer (L=4) is made three nodes. The output values from the nodes of the output layer (L=4) are shown by $y_1'$, $y_2'$, $y_3'$. These output values $y_1'$, $y_2'$, $y_3'$ are sent to a softmax layer SM where they are converted to the respectively corresponding output values $y_1$, $y_2$, $y_3$. The total of these output values $y_1$, $y_2$, $y_3$ is 1, while the output values $y_1$, $y_2$, $y_3$ show the ratios to 1.

Next, the input values $x_1$, $x_2$, $x_3$ in FIG. 10 will be explained referring to the list shown in FIG. 11. Now then, as explained above, the pressure Pm inside the intake passage downstream of the throttle valve 19, that is, the intake pressure Pm, is determined in accordance with the engine load and engine speed if no abnormality occurs in the PCV system. If an abnormality occurs in the PCV system, the intake pressure Pm changes from the intake pressure Pm at normal times. Therefore, in the first embodiment according to the present invention, the engine load is made the input value $x_1$, the engine speed is made the input value $x_2$, and the measured value of the intake pressure Pm downstream of the throttle valve 19 detected by the pressure sensor 25 is made the input value $x_3$.

FIG. 12 shows a list of what kind of abnormal states the output values $y_1'$, $y_2'$, $y_3'$ and the output values $y_1$, $y_2$, $y_3$ shown in FIG. 10 indicate. As will be understood from FIG. 12, the output value $y_1'$ and the output value $y_1$ show the abnormality of leakage of blow-by gas occurring when the PVC hose detaches from the connecting part with the PCV valve 22 or the connecting part with the inside of the intake duct 15 or a hole forms in the PVC hose, the output value $y_2'$ and the output value $y_2$ show the abnormality of stuck opening of the PCV valve 22 resulting from the valve element 52 continuing to open, and the output value $y_3'$ and the output value $y_3$ show normal times. Furthermore, FIG. 12 shows the operating state of the engine when judging if the abnormality of leakage of blow-by gas occurs and if the abnormality of stuck opening of the PCV valve 22 occurs. Note that, regarding the output value of the first neural network, in any embodiment explained from here on, the output values $y_2'$, $y_3'$ and the output values $y_1$, $y_2$, $y_3$ shown in the list of FIG. 12 are the same. Therefore, in the embodiments explained from here, the explanation relating to the output values $y_1'$, $y_2'$, $y_3'$ and the output values $y_1$, $y_2$, $y_3$ will be omitted.

FIG. 13 shows a training data set prepared using the input values $x_1$, $x_2$, $x_3$ and training data, that is, truth labels yt. In this FIG. 13, the input values $x_1$, $x_2$, $x_3$, as explained above, respectively show the engine load, engine speed, and measured value of the intake pressure Pm downstream of the throttle valve 19 detected by the pressure sensor 25. In this case, for the engine load and engine speed, the values calculated in the electronic control unit 30 are used.

On the other hand, in FIG. 13, $yt_1$, $yt_2$, $yt_3$ respectively show the training data, that is, the truth labels, for the output values $y_1'$, $y_2'$, $y_3'$ and the output values $y_1$, $y_2$, $y_3$ shown in FIG. 10. That is, in FIG. 13, $yt_1$ shows the truth label when the abnormality of leakage of blow-by gas occurs, $yt_2$ shows the truth label when the abnormality of stuck opening of the PCV valve 22 occurs, and $yt_3$ shows the truth label at normal times. In this case, for example, when the abnormality of leakage of blow-by gas occurs, only the truth label $yt_1$ is made 1, while the remaining truth labels $yt_2$, $yt_3$ are all made zero. Similarly, when the abnormality of stuck opening of the PCV valve 22 occurs, only the truth label $yt_2$ is made 1 and the remaining truth labels $yt_1$, $yt_3$ are all made zero. At normal times, only the truth label $yt_3$ is made 1 and the remaining truth labels $yt_1$, $yt_2$ are all made zero.

On the other hand, as shown in FIG. 13, in the training data set, "m" number of data showing the relationships between the input values $x_1$, $x_2$, $x_3$ and the truth labels yt are acquired. For example, for the No. 2 data, the acquired input values $x_{12}$, $x_{22}$, $x_{32}$ and truth labels $yt_{12}$, $yt_{22}$, $yt_{32}$ are shown. For the No. m−1 data, the input values $x_{2m-1}$, $x_{3m-1}$ of the acquired input parameters and truth labels $yt_{1m-1}$, $yt_{2m-1}$, $yt_{3m-1}$ are shown.

Figure 14:
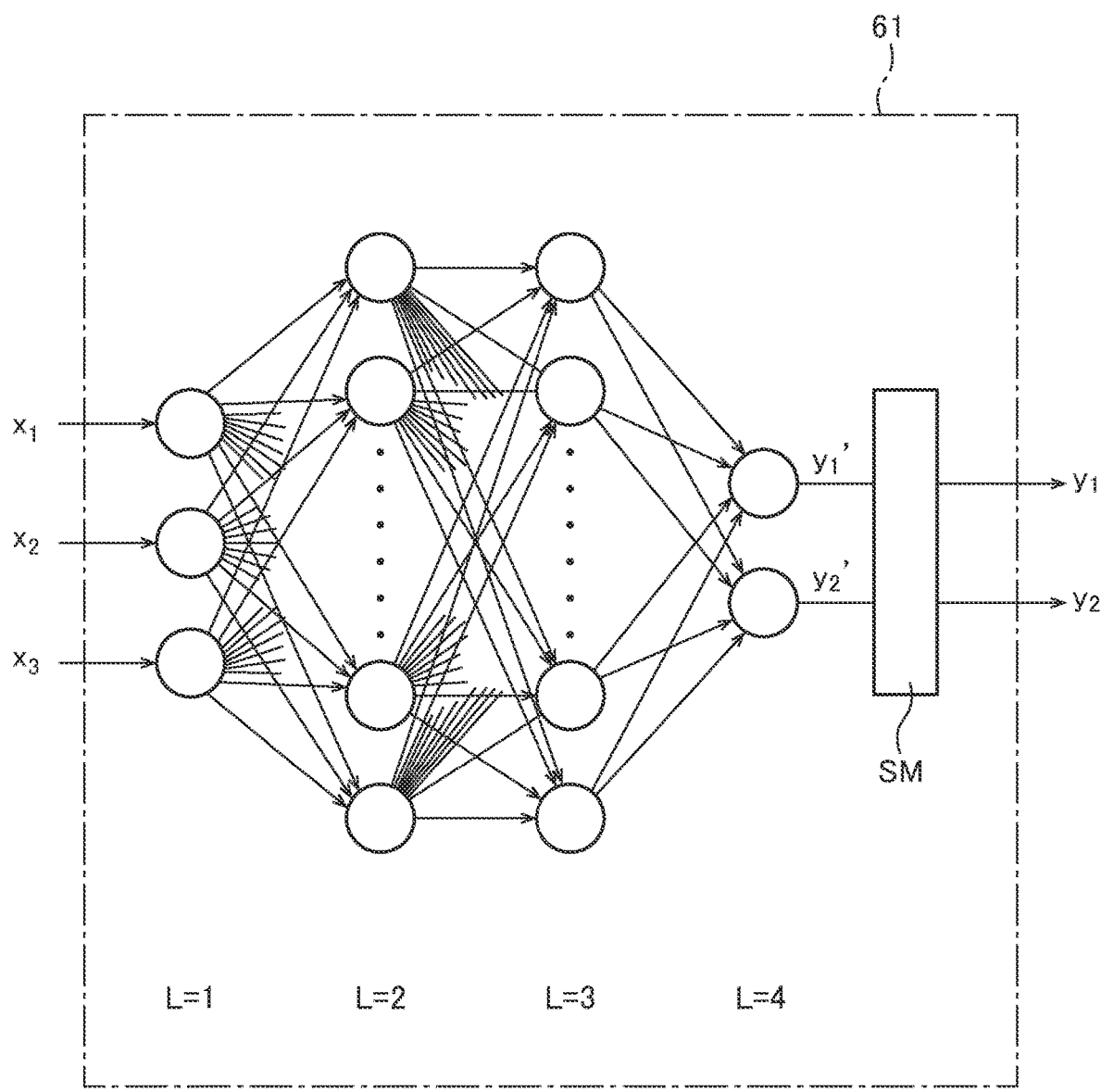
FIG. 14 is a view showing a second neural network used in an embodiment according to the present invention.

Next, one embodiment of the second neural network used for preparing the second model estimating judgment of abnormalities able to accurately estimate if the abnormality of stuck closing of the PCV valve 22 occurs at the time of engine medium load steady operation will be explained while referring to FIG. 14. Referring to FIG. 14, in this second neural network 61 as well, in the same way as the first neural network 60 shown in FIG. 10, L=1 shows the input layer, L=2 and L=3 show hidden layers, and L=4 shows the output layer. In this second neural network 61 as well, as shown in FIG. 14, the input layer (L=1) is comprised of three nodes. Three input values $x_1$, $x_2$, $x_3$ are input to the nodes of the input layer (L=1).

On the other hand, FIG. 14 describes the hidden layer (L=2) and hidden layer (L=3), but the number of the hidden layers may also be one or any other number. Further, the numbers of the nodes of these hidden layers may also be made any numbers. Further, in this embodiment, the number of nodes of the output layer (L=4) is made two nodes. The output values from the nodes of the output layer (L=4) are shown by $y_1'$, $y_2'$. These output values $y_1'$, $y_2'$ are sent to a softmax layer SM where they are converted to the respectively corresponding output values $y_1$, $y_2$. The total of these output values $y_1$, $y_2$ is 1. The output values $y_1$, $y_2$ show the ratio with respect to 1. Note that, in this case, it is also possible not to use the softmax layer SM, make the number of nodes of the output layer (L=4) 1 node, and make the activation function at this node a Sigmoid function for binary classification.

On the other hand, the input values $x_1$, $x_2$, $x_3$ in FIG. 14 are the same as the input values $x_1$, $x_2$, $x_3$ in FIG. 10. That is, in the second neural network 61 shown in FIG. 14 as well, as shown in the list of FIG. 11, the engine load is made the input value $x_1$, the engine speed is made the input value $x_2$, and the measured value of the intake pressure Pm downstream of the throttle valve 19 detected by the pressure sensor 25 is made the input value $x_3$.

FIG. 15 shows a list showing what kind of abnormal states are shown by the output values $y_2'$ and the output values $y_1$, $y_2$ shown in FIG. 14. As will be understood from FIG. 15, the output value and the output value $y_1$ show the abnormality of stuck closing of the PCV valve 22 resulting from the valve element 52 continuing to close while the output value $y_2'$ and the output value $y_2$ show the normal times. Furthermore, FIG. 15 shows the operating state of the engine when judging if the abnormality of stuck closing of the PCV valve 22 occurs. Note that, regarding the output values of the second neural network, in all of the embodiments explained from here on, the output values $y_2'$ and the output values $y_1$, $y_2$ shown in the list of FIG. 15 are the same. Therefore, in the embodiments explained from here, explanations regarding these output values $y_2'$ and output values $y_1$, $y_2$ will be omitted.

FIG. 16 shows a training data set of the second neural network 61 prepared using the input values $x_1$, $x_2$, $x_3$ and training data, that is, the truth labels yt. In this FIG. 16, the input values $x_1$, $x_2$, $x_3$, as explained above, respectively show the engine load, the engine speed, and the measured value of the intake pressure Pm downstream of the throttle valve 19 detected by the pressure sensor 25. In this case, for the engine load and the engine speed, the values calculated inside the electronic control unit 30 are used.

On the other hand, in FIG. 16, $yt_1$, $yt_2$ respectively show the training data, that is, the truth labels, for the output values $y_2'$ and the output values $y_1$, $y_2$ shown in FIG. 14. That is, in FIG. 16, $yt_1$ shows a truth label when the abnormality of stuck closing of the PCV valve 22 occurs, while $yt_2$ shows a truth label for normal times. In this case, for example, when the abnormality of stuck closing of the PCV valve 22 occurs, the truth label $yt_1$ is made 1 and the remaining truth label $yt_2$ is made zero, while at normal times, the truth label $yt_1$ is made 1 and the remaining truth label $yt_2$ is made zero.

On the other hand, as shown in FIG. 16, in this training data set, "m" number of data showing the relationship between the input values $x_1$, $x_2$, $x_3$ and the truth labels yt are acquired.

For example, for the No. 2 data, the acquired input values $x_{12}$, $x_{22}$, $x_{32}$ and the truth labels $yt_{12}$, $yt_{22}$ are shown, while for the No. m−1 data, the acquired input values $x_{1m-1}$, $x_{2m-1}$, $x_{3m-1}$ of the input parameters and the truth labels $yt_{1m-1}$, $yt_{2m-1}$ are shown.

FIG. 17 shows a list of the second embodiment of the input values $x_1$, $x_2$, $x_3$ in FIG. 10 and the input values $x_1$, $x_2$, $x_3$ in FIG. 14. In this second embodiment, as shown in FIG. 17, the engine load is made the input value $x_1$, the engine speed is made the input value $x_2$, and the estimated value of the intake pressure Pm downstream of the throttle valve 19 is made the input value $x_3$. As explained above, the estimated value of the intake pressure Pm is found using the amount of intake air mt, the pressure Pa inside the intake passage upstream of the throttle valve 19, and the temperature Ta at the inside of the intake passage upstream of the throttle valve 19 respectively detected by the intake air amount detector 16, the atmospheric pressure sensor 27, and the atmospheric temperature sensor 28, and using the open area TA of the throttle valve 19 calculated based on the detected value of the throttle valve opening degree sensor 26 and the relationship shown in FIG. 9.

On the other hand, in the second embodiment as well, two neural networks similar to the first neural network 60 shown in FIG. 10 and the second neural network 61 shown in FIG. 14 are used and two training data sets similar to the training data set shown in FIG. 13 and the training data set shown in FIG. 16 are used. However, in the second embodiment, regarding the input values $x_1$ and $x_2$, in the same way as the first embodiment, the engine load is made the input value $x_1$ and the engine speed is made the input value $x_2$, but regarding the input value $x_3$, unlike the first embodiment, the estimated value of the intake pressure Pm downstream of the throttle valve 19 is made the input value $x_3$. In this second embodiment, there is the advantage that the pressure sensor 25 is not required.

FIG. 18 shows a list of the input values in the third embodiment. Referring to the list shown in FIG. 18, in this third embodiment, the input values comprise the four input values $x_1$, $x_2$, $x_3$, $x_4$. That is, the engine load is made the input value $x_1$, the engine speed is made the input value $x_2$, the measured value of the intake pressure Pm downstream of the throttle valve 19 is made the input value $x_3$, and the estimated value of the intake pressure Pm downstream of the throttle valve 19 is made the input value $x_4$. In this case, the measured value of the intake pressure Pm is detected by the pressure sensor 25, while the estimated value of the intake pressure Pm is found using the amount of intake air mt, the pressure Pa in the intake passage upstream of the throttle valve 19, and the temperature Ta inside the intake passage upstream of the throttle valve 19 respectively detected by the intake air amount detector 16, the atmospheric pressure sensor 27, and the atmospheric temperature sensor 28, and using the open area TA of the throttle valve 19 calculated based on the detected value of the throttle valve opening degree sensor 26 and the relationship shown in FIG. 9.

Figure 19:
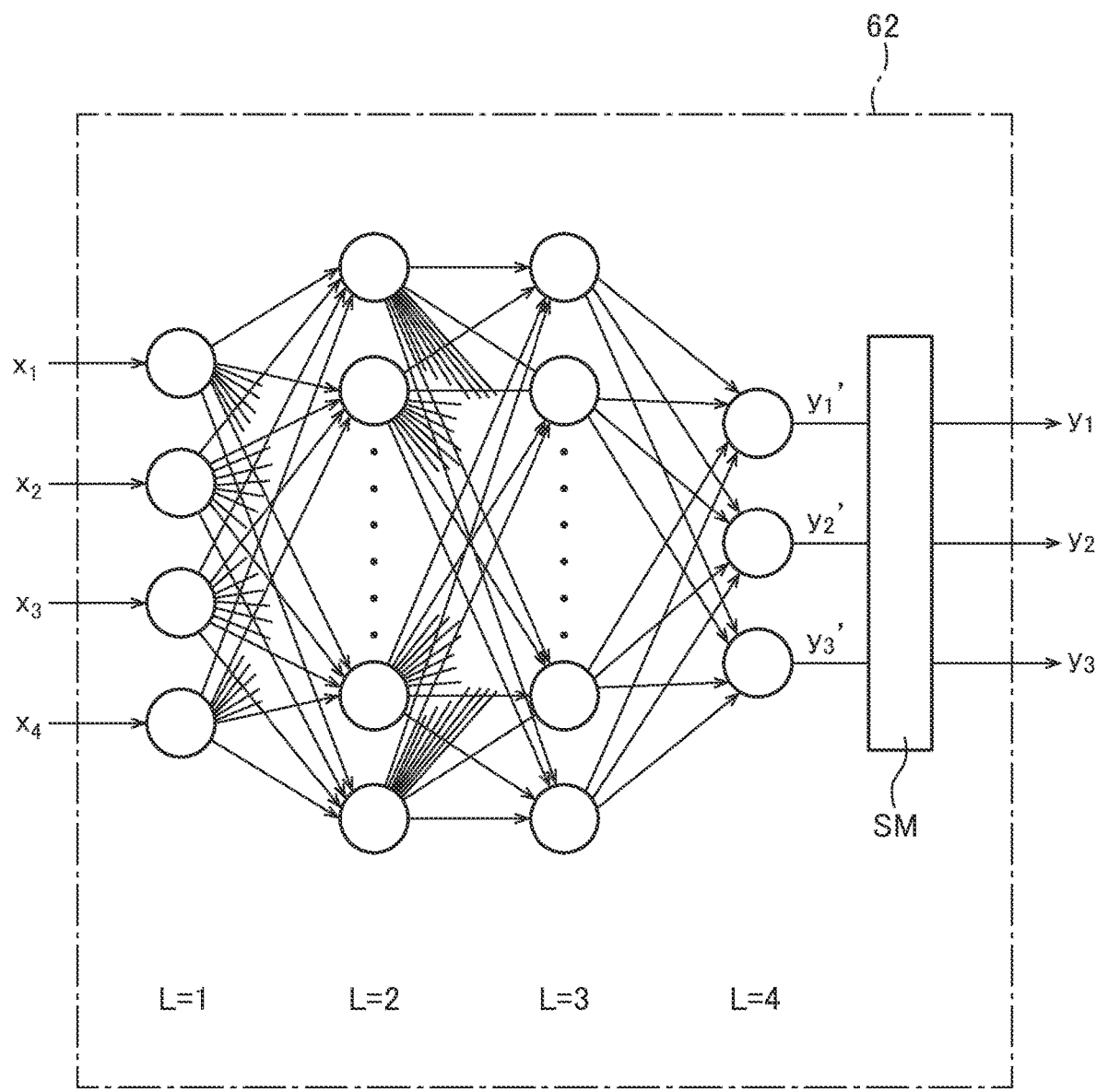
FIG. 19 is a view showing another example of the first neural network.
Figure 21:
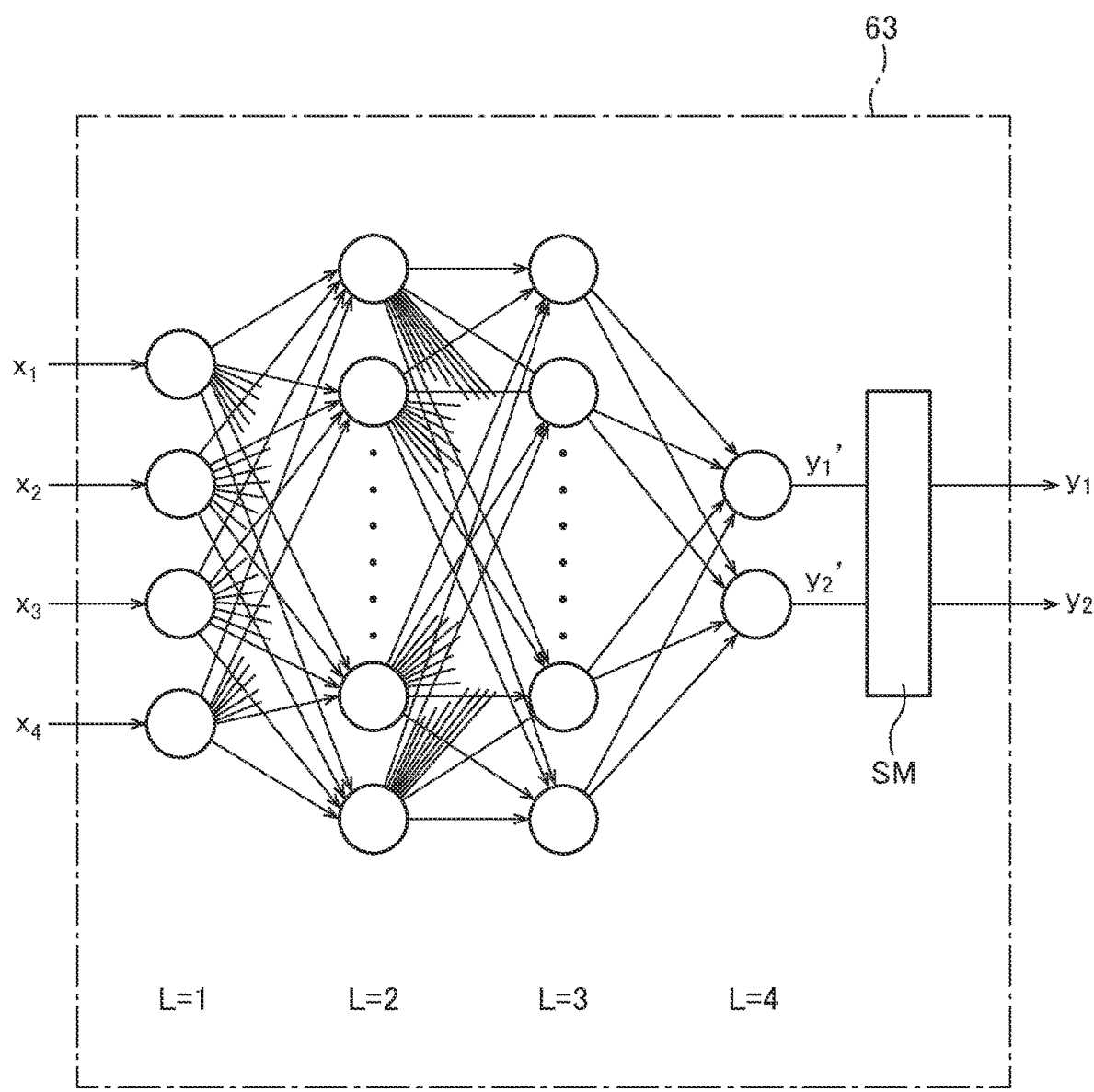
FIG. 21 is a view showing another example of the second neural network.

FIG. 19 shows a first neural network 62 used in this third embodiment, while FIG. 20 shows a training data set for this first neural network 62. Further, FIG. 21 shows a second neural network 63 used in this third embodiment, while FIG. 22 shows a training data set for this second neural network 63. As shown in FIG. 19 and FIG. 21, in the first neural network 62 and second neural network 63, the input layer (L=1) is comprised of four nodes. Four input values $x_1$, $x_2$, $x_3$, $x_4$, that is, the engine load (input value $x_1$), the engine speed (input value $x_2$), the measured value of the intake pressure Pm downstream of the throttle valve 19 (input value $x_3$), and the estimated value of the intake pressure Pm downstream of the throttle valve 19 (input value $x_4$) are input to the nodes of the input layer (L=1). Further, $x_1$, $x_2$, $x_3$, $x_4$ in the training data sets shown in FIG. 20 and FIG. 22 respectively show the engine load, the engine speed, the measured value of the intake pressure Pm downstream of the throttle valve 19, and the estimated value of the intake pressure Pm downstream of the throttle valve 19. In this way, in this third embodiment, by using as the input values the measured value of the intake pressure Pm downstream of the throttle valve 19 and the estimated value of the intake pressure Pm downstream of the throttle valve 19, the precision of judgment of whether an abnormality occurs in the blow-by gas feed path 20 or PCV valve 22 can be further raised.

FIG. 23 shows a list of input values in the fourth embodiment. Referring to the list shown in FIG. 23, in this fourth embodiment, the input values comprise the six input values $x_1$, $x_2$, $x_3$, $x_4$, $x_5$, $x_6$. That is, the engine load is made the input value $x_1$, the engine speed is made the input value $x_2$, the amount of intake air detected by the intake air amount detector 16 is made the input value $x_3$, the throttle valve opening degree detected by the throttle valve opening degree sensor 26 is made the input value $x_4$, the atmospheric temperature detected by the atmospheric temperature sensor 28 is made the input value $x_5$, and the atmospheric pressure detected by the atmospheric pressure sensor 27 is made the input value $x_6$. In other words, in this fourth embodiment, as the input values, in addition to the engine load and the engine speed, the amount of intake air mt, the pressure Pa at the inside of the intake passage upstream of the throttle valve 19, the temperature Ta inside the intake passage upstream of the throttle valve 19, and the throttle valve opening degree required for finding the estimated value of the intake pressure Pm are used.

Figure 24:
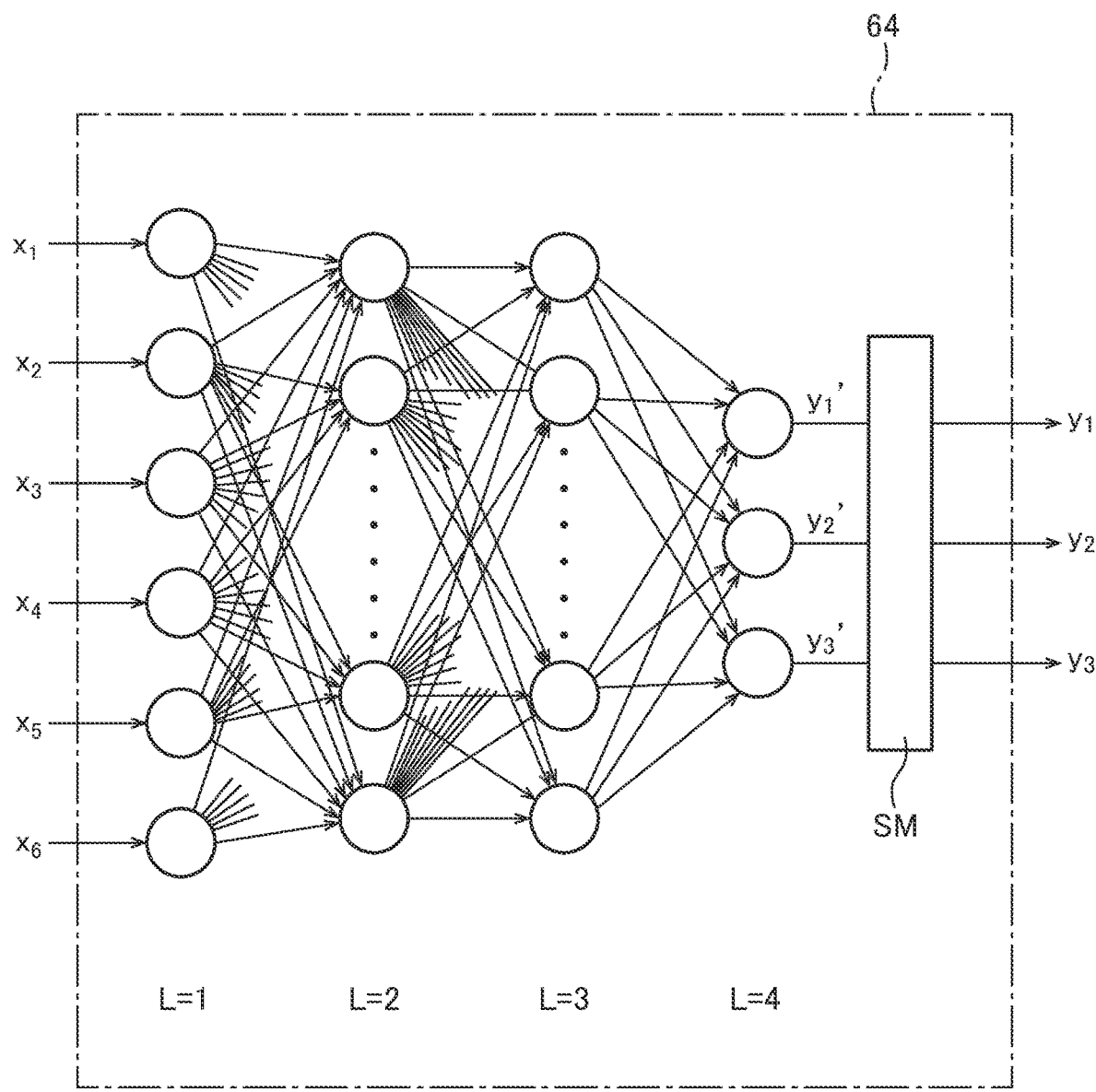
FIG. 24 is a view showing still another example of the first neural network.
Figure 26:
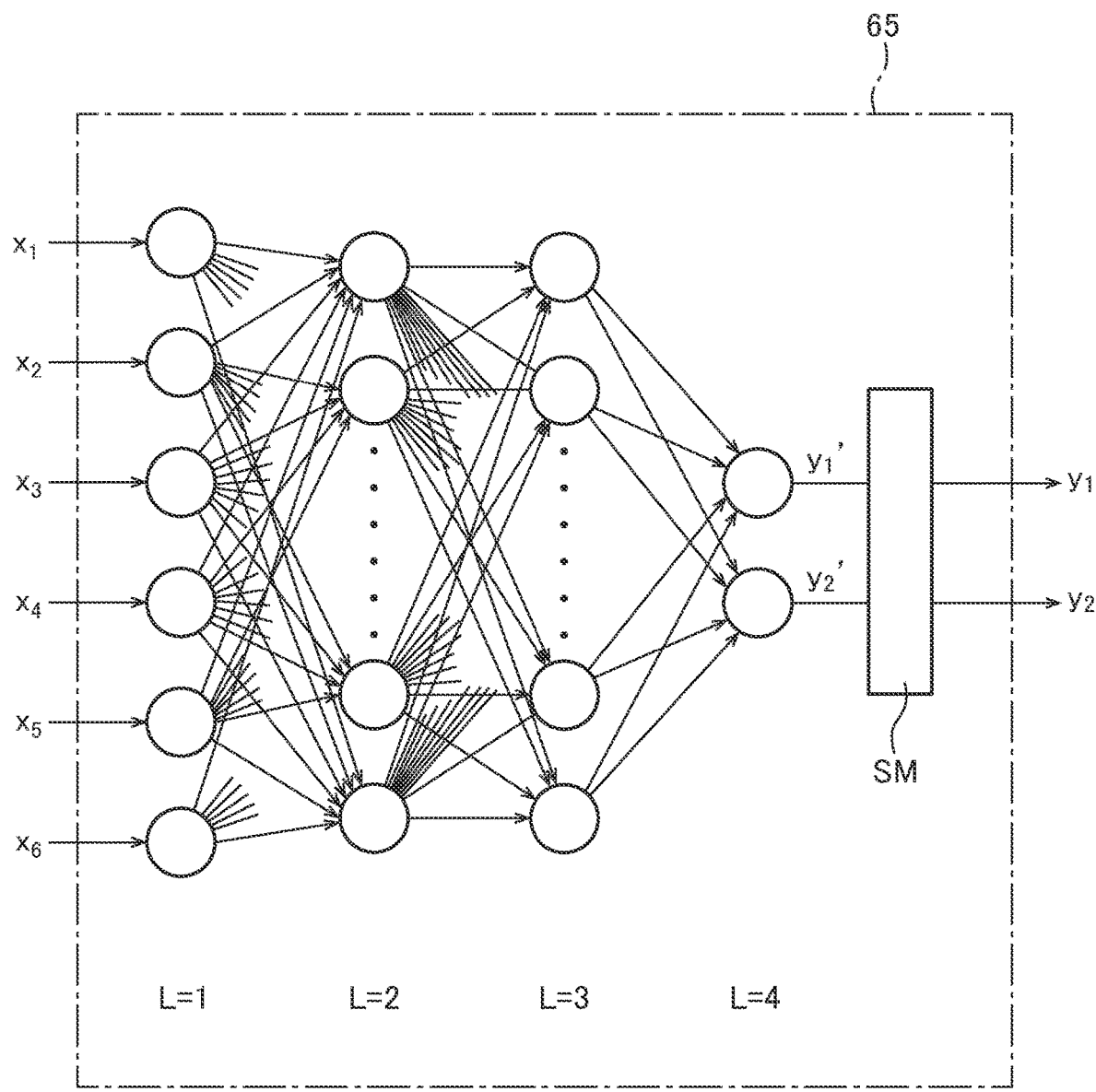
FIG. 26 is a view showing another example of the second neural network.

FIG. 24 shows a first neural network 64 used in this fourth embodiment, while FIG. 25 shows a training data set for this first neural network 64. Further, FIG. 26 shows a second neural network 65 used in this fourth embodiment, while FIG. 27 shows a training data set for this second neural network 65. As shown in FIG. 24 and FIG. 26, in the first neural network 64 and second neural network 65, the input layer (L=1) is comprised of six nodes. Six input values $x_1$, $x_2$, $x_3$, $x_4$, $x_5$, $x_6$, that is, the engine load (input value $x_1$), the engine speed (input value $x_2$), the amount of intake air (input value $x_3$), the throttle valve opening degree (input value $x_4$), the atmospheric temperature (input value $x_5$), and the atmospheric pressure (input value $x_6$), are input to the nodes of the input layer (L=1). Further, $x_1$, $x_2$, $x_3$, $x_4$, $x_5$, $x_6$ in the training data sets shown in FIG. 25 and FIG. 27 respectively show the engine load, the engine speed, the amount of intake air, the throttle valve opening degree, the atmospheric temperature, and the atmospheric pressure.

Figure 28:
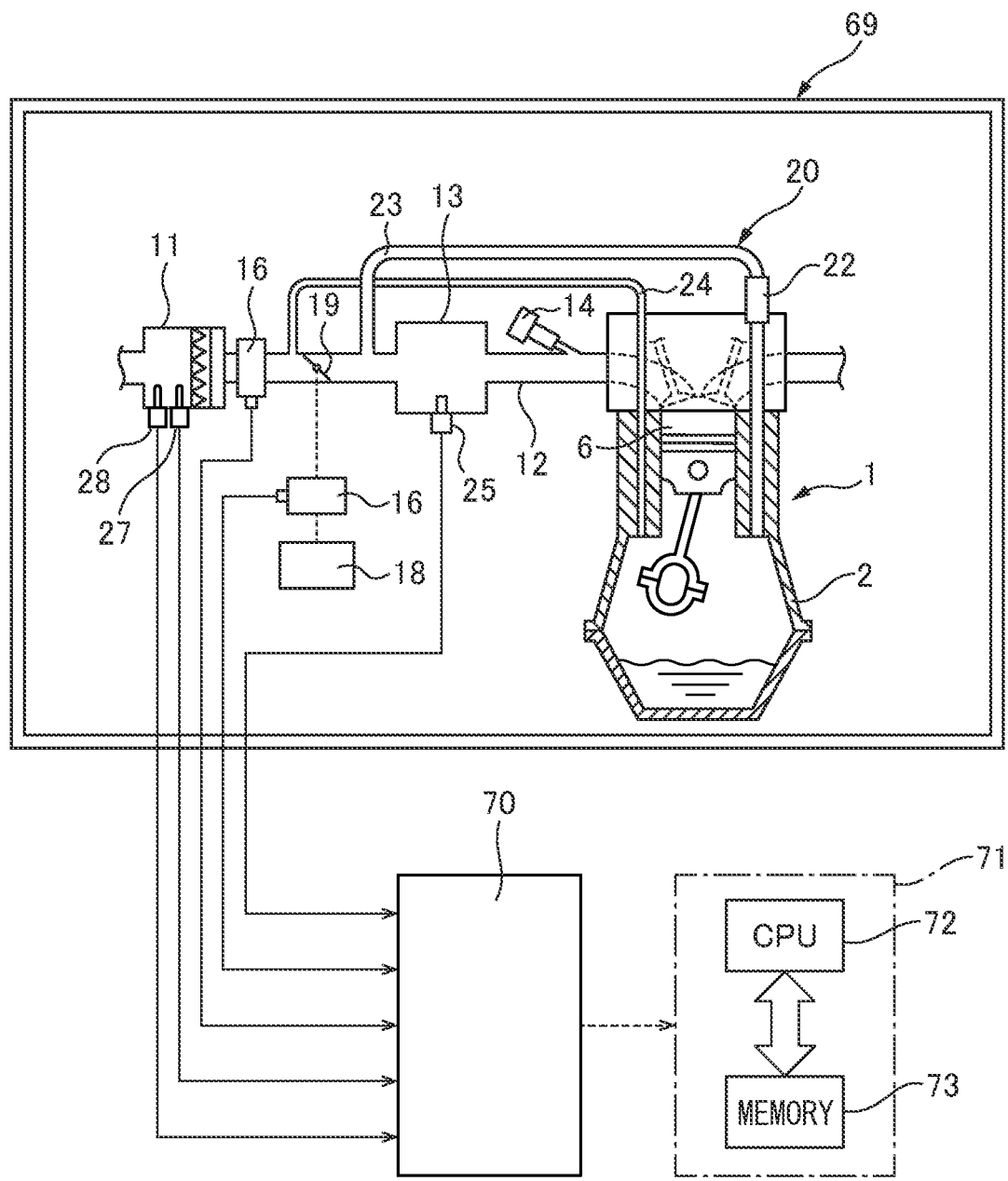
FIG. 28 is a view for explaining a learning method.

Next, the method of preparing the various training data sets used in the first embodiment to the fourth embodiment explained up to now will be explained. FIG. 28 shows one example of the method of preparing a training data set. Referring to FIG. 28, the engine body 1 shown in FIG. 1 is set inside a test chamber 69 able to be adjusted in internal temperature and internal pressure. Due to a test control device 70, the engine load, engine speed, etc. are respectively adjusted to various values for obtaining the data required for preparing the training data set. At this time, the state of the blow-by gas feed path 20 is successively changed to an abnormal state of leakage of blow-by gas resulting from the PVC hose detaching from a connecting part with the PCV valve 22, an abnormal state of leakage of blow-by gas resulting from the PVC hose detaching from a connecting part with the inside of the intake duct 15, an abnormal state of leakage of blow-by gas resulting from a hole forming in the PVC hose, an abnormal state of stuck opening of the PCV valve 22 resulting from the valve element 52 continuing to open, an abnormal state of stuck closing of the PCV valve 22 resulting from the valve element 52 continuing to close, and a normal state. In each changed state, the combination of the engine load, engine speed, etc. is successively changed to thereby acquire the data required for preparation of the training data set.

Figure 29:
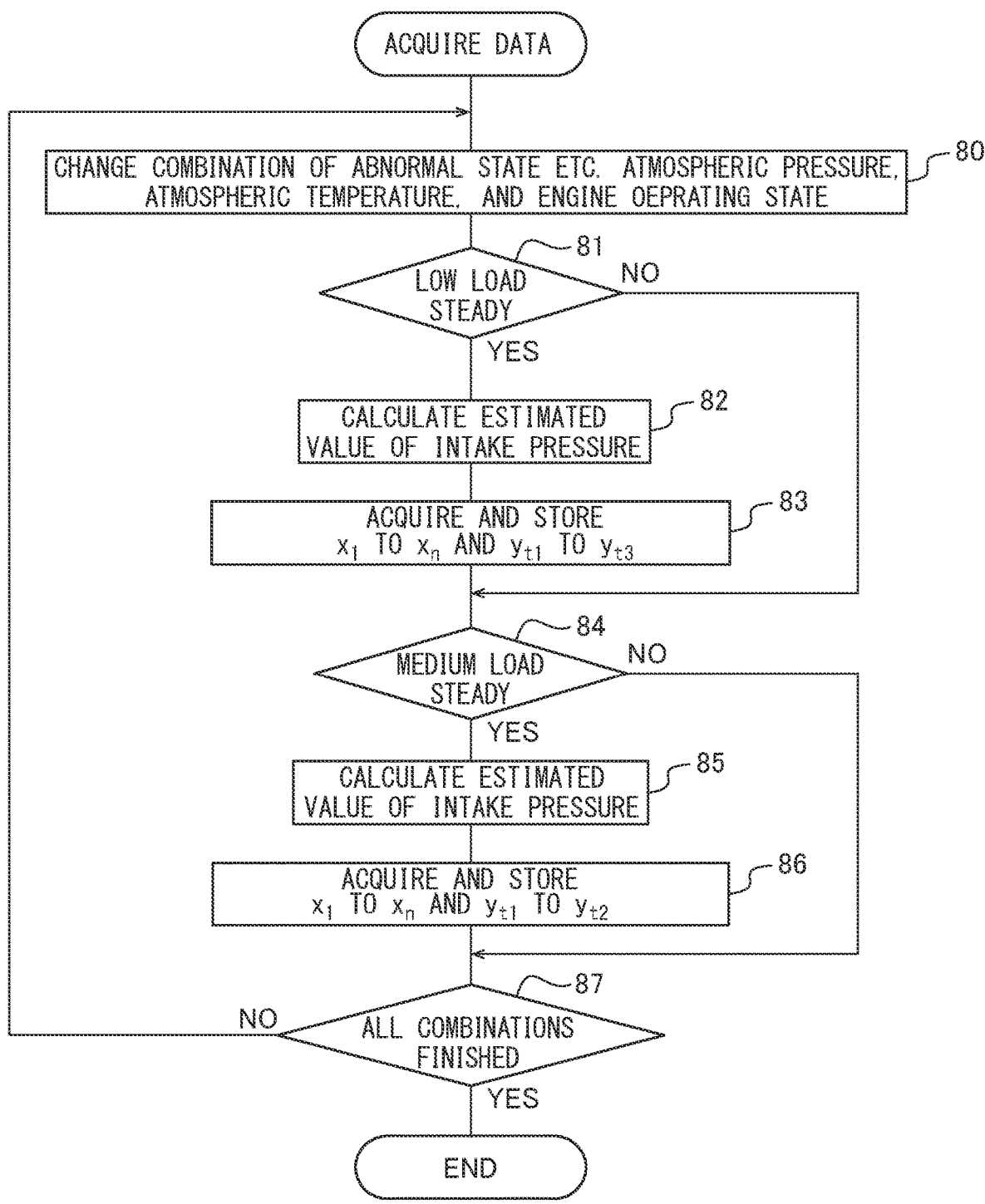
FIG. 29 is a flow chart for performing processing for acquiring data.

FIG. 29 shows the routine for acquiring the data required for preparing a training data set. Referring to FIG. 29, first, at step 80, the combination of the normal state and abnormal state of the blow-by gas feed path 20, the atmospheric temperature (internal temperature inside the test chamber 69), the atmospheric pressure (internal pressure inside the test chamber 69), and the engine operating state is changed. Note that, when first proceeding to step 80, these state of the blow-by gas feed path 20, atmospheric temperature, atmospheric pressure, and engine operating state are made the preset initial states. Next, at step 81, it is judged if an engine low load steady operation is underway. When engine low load steady operation is not underway, the routine jumps to step 84. As opposed to this, when an engine low load steady operation is underway, the routine proceeds to step 82.

At step 82, the estimated value of the intake pressure Pm is calculated using the amount of intake air mt, the pressure Pa inside the intake passage upstream of the throttle valve 19, and the temperature Ta inside the intake passage upstream of the throttle valve 19 respectively detected by the intake air amount detector 16, the atmospheric pressure sensor 27, and the atmospheric temperature sensor 28, and using the open area TA of the throttle valve 19 calculated based on the detected value of the throttle valve opening degree sensor 26 and the relationship shown in FIG. 9. Note that, the processing for calculation of the estimated value of the intake pressure Pm at this step 82 is performed only when preparing the training data sets for the second embodiment and third embodiment. When preparing the training data sets for the first embodiment and fourth embodiment, this step 82 is omitted.

Next, at step 83, the input value $x_1$ . . . input value $x_n$ and the training data for the output values $y_1'$, $y_2'$, $y_3'$ and the output values $y_1$, $y_2$, $y_3$, that is, the truth labels $yt_1$, $yt_2$, $yt_3$, are acquired and stored in the test control device 70. In this case, the input values acquired and stored inside the test control device 70, as explained above, in the first embodiment. are the engine load (input value $x_1$), engine speed (input value $x_2$), and measured value of the intake pressure Pm downstream of the throttle valve 19 (input value $x_3$), in the second embodiment, are the engine load (input value $x_1$), engine speed (input value $x_2$), and estimated value of the intake pressure Pm downstream of the throttle valve 19 (input value $x_3$), in the third embodiment, are the engine load (input value $x_1$), engine speed (input value $x_2$), measured value of the intake pressure Pm downstream of the throttle valve 19 (input value $x_3$), and estimated value of the intake pressure Pm downstream of the throttle valve 19 (input value $x_4$), and, in the fourth embodiment, are the engine load (input value $x_1$), engine speed (input value $x_2$), amount of intake air (input value $x_3$), throttle valve opening degree (input value $x_4$), atmospheric temperature (input value $x_5$), and atmospheric pressure (input value $x_6$).

On the other hand, the training data acquired at step 83 and stored inside the test control device 70, that is, the truth labels $yt_1$, $yt_2$, $yt_3$ are common for all of the embodiments. $yt_1$ shows the truth label when the abnormality of leakage of blow-by gas occurs, $yt_2$ shows the truth label when the abnormality of stuck opening of the PCV valve 22 occurs, and $yt_3$ shows the truth label at normal times. In this case, as explained above, for example, when the abnormality of leakage of blow-by gas occurs, only the truth label $yt_1$ is made 1 and the remaining truth labels $yt_2$, $yt_3$ are all made zero. Similarly, when the abnormality of stuck opening of the PCV valve 22 occurs, only the truth label $yt_2$ is made 1 and the remaining truth labels $yt_1$, $yt_3$ are all made zero. At normal times, only the truth label $yt_3$ is made 1 and the remaining truth labels $yt_1$, $yt_2$ are all made zero. Next, the routine proceeds to step 84.

At step 84, it is judged if an engine medium load steady operation is underway. If an engine medium load steady operation is not underway, the routine jumps to step 87. As opposed to this, if an engine medium load steady operation is underway, the routine proceeds to step 85. At step 85, the estimated value of the intake pressure Pm is calculated using the amount of intake air mt, pressure Pa inside the intake passage upstream of the throttle valve 19, and temperature Ta inside the intake passage upstream of the throttle valve 19 respectively detected by the intake air detector 16, atmospheric pressure sensor 27, and atmospheric temperature sensor 28, and using the open area TA of the throttle valve 19 calculated based on the detected value of the throttle valve opening degree sensor 26 and the relationship shown in FIG. 9. Note that, the processing for calculation of the estimated value of the intake pressure Pm at this step 85 is performed only when preparing the training data sets for the second embodiment and third embodiment. When preparing the training data sets for the first embodiment and fourth embodiment, this step 85 is omitted.

Next, at step 86, the input value $x_1$ ... input value $x_n$ and the training data for the output values $y_1'$, $y_2'$ and the output values $y_1$, $y_2$, that is, the truth labels $yt_1$, $yt_2$, are acquired and are stored in the test control device 70. In this case, the input values acquired and stored in the test control device 70, as explained above, in the first embodiment. are the engine load (input value $x_1$), engine speed (input value $x_2$), and measured value of the intake pressure Pm downstream of the throttle valve 19 (input value $x_3$), in the second embodiment, are the engine load (input value $x_1$), engine speed (input value $x_2$), and estimated value of the intake pressure Pm downstream of the throttle valve 19 (input value $x_3$), in the third embodiment, are the engine load (input value $x_1$), engine speed (input value $x_2$), measured value of the intake pressure Pm downstream of the throttle valve 19 (input value $x_3$), and estimated value of the intake pressure Pm downstream of the throttle valve 19 (input value $x_4$), and, in fourth embodiment, are the engine load (input value $x_1$), engine speed (input value $x_2$), amount of intake air (input value $x_3$), throttle valve opening degree (input value $x_4$), atmospheric temperature (input value $x_5$), and atmospheric pressure (input value $x_6$).

On the other hand, the training data acquired and stored in the test control device 70 at step 86, that is, the truth labels $yt_1$, $yt_2$, are common for all of the embodiments. $yt_1$ shows a truth label when the abnormality of stuck closing of the PCV valve 22 occurs while $yt_2$ shows a truth label at normal times. In this case, as explained above, for example, when the abnormality of stuck closing of the PCV valve 22 occurs, the truth label $yt_1$ is made 1 and the remaining truth label $yt_2$ is made zero, while at normal times, the truth label $yt_2$ is made 1 and the remaining truth label $yt_1$ is made zero. Next, the routine proceeds to step 87.

At step 87, it is judged if data has finished being acquired for all combinations of the normal state of the blow-by gas feed path 20, the abnormal state of the blow-by gas feed path 20, the atmospheric temperature, atmospheric pressure. and engine operating state. Note that, in this case, when preparing the training data set for the first embodiment, the atmospheric temperature and atmospheric pressure are maintained constant. When at step 87 it is judged that data has not finished being acquired for all combinations of the normal state of the blow-by gas feed path 20, the abnormal state of the blow-by gas feed path 20, the atmospheric temperature, atmospheric pressure. and engine operating state, the routine returns to step 80 where one of the state of the blow-by gas feed path 20, the atmospheric temperature, atmospheric pressure, and engine operating state is changed. Next, if it is judged at step 87 that data has finished being acquired for all combinations of the state of the blow-by gas feed path 20, the atmospheric temperature, atmospheric pressure. and engine operating state, the processing for acquiring data is completed.

If the training data sets are prepared in this way, using the electronic data of the prepared training data sets, in the first embodiment and the second embodiment, the weights of the first neural network 60 shown in FIG. 10 and the second neural network 61 shown in FIG. 14 are learned, in the third embodiment, the weights of the first neural network 62 shown in FIG. 19 and the second neural network 63 shown in FIG. 21 are learned, and in the fourth embodiment, the weights of the first neural network 64 shown in FIG. 24 and the second neural network 65 shown in FIG. 26 are learned. In the example shown in FIG. 28, a learning device 71 is provided for learning the weights of the neural networks 60, 61, 62, 63, 64, 65. As this learning device 71, a PC can also be used. As shown in FIG. 28, this learning device 71 is provided with a CPU (microprocessor) 72 and a storage device, that is, memory 73. In the example shown in FIG. 28, the number of nodes of the neural network corresponding to the embodiment and the electronic data of the training data set prepared corresponding to the embodiment are stored in the memory 73 of the learning device 71 and the weights of the neural network are learned at the CPU 72.

Figure 30:
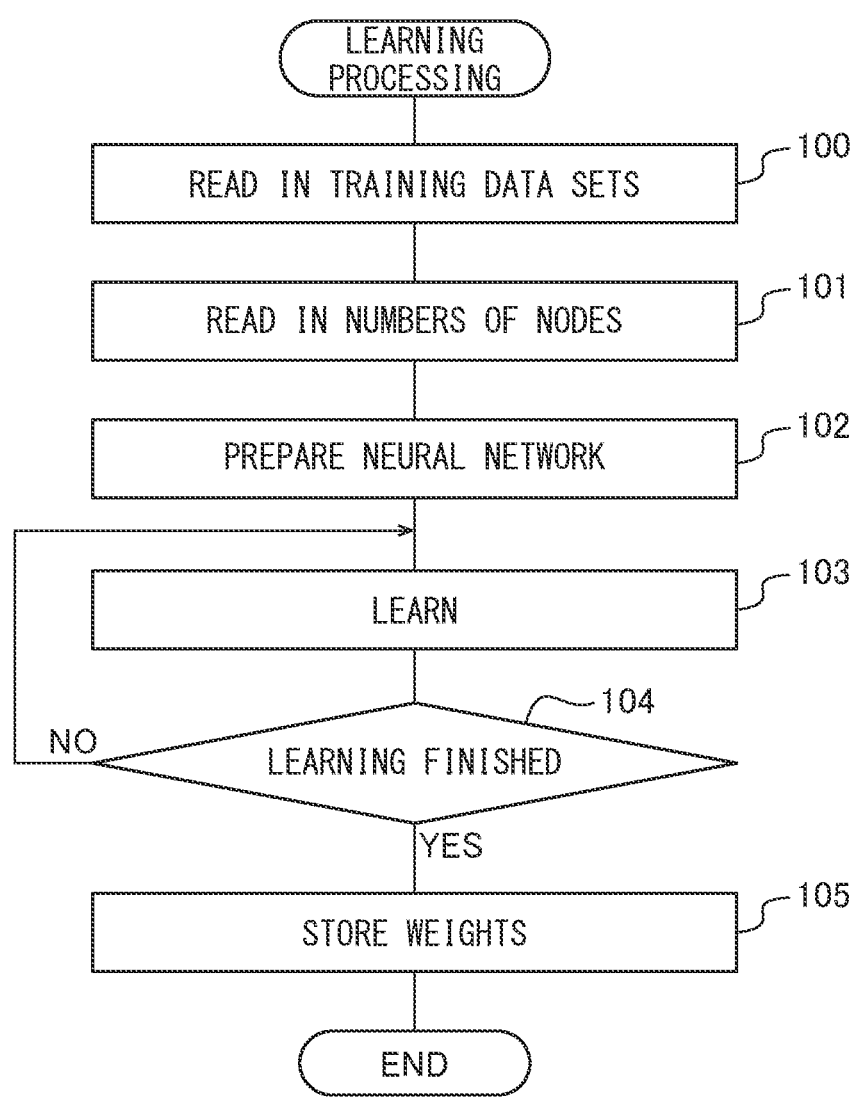
FIG. 30 is a flow chart for performing learning processing.

FIG. 30 shows a processing routine for learning weights of a neural network performed at the learning device 71. Referring to FIG. 30, first, at step 100, data of the training data set corresponding to the embodiment stored at the memory 73 of the learning device 71 is read in. Next, at step 101, the number of nodes of the input layer (L=1) of the neural networks 60, 61, 62, 63, 64, 65, the numbers of nodes of the hidden layer (L=2) and hidden layer (L=3), and the number of nodes of the output layer (L=4) corresponding to the embodiment are read in. Next, at step 102, based on these numbers of nodes, neural networks 60, 61, 62, 63, 64, 65 corresponding to the embodiment are prepared.

Next, at step 103, the weights of the neural networks 60, 61, 62, 63, 64, 65 corresponding to the embodiment are learned. At this step 103, first, the No. 1 input value $x_1 \ldots x_n$ of the training data set corresponding to the embodiment are input to the nodes of the input layer (L=1) of the neural networks 60, 61, 62, 63, 64, 65. At this time, if the weights of the first neural networks 60, 62, 64 are being learned, the output values $y_1'$, $y_2'$, $y_3'$ are output from the nodes of the output layer of the neural networks 60, 62, 64. These output values $y_1'$, $y_2'$, $y_3'$ are sent into the softmax layer SM where they are converted to the respectively corresponding output values $y_1$, $y_2$, $y_3$. Next, using these output values $y_1$, $y_2$, $y_3$ and truth labels $yt_1$, $yt_2$, $yt_3$, the above-mentioned cross entropy error E is calculated. The weights of the neural networks 60, 62, 64 are learned using the above-mentioned backpropagation method so that the cross entropy error E becomes smaller.

On the other hand, if at this time the weights of the second neural networks 61, 63, 65 are being learned, the output values $y_1'$, $y_2'$ are output from the nodes of the output layer of the neural networks 61, 63, 65. These output values $y_1'$, $y_2'$ are sent to the softmax layer SM where they are converted to the respectively corresponding output values $y_1$, $y_2$. Next, due to these output values $y_1$, $y_2$ and truth labels $yt_1$, $yt_2$, the above-mentioned cross entropy error E is calculated and the above-mentioned backpropagation method is used for learning of the weights of the neural networks 61, 63, 65 so that the cross entropy error E becomes smaller.

If the weights of the neural networks 60, 61, 62, 63, 64, 65 finish being learned based on the No. 1 data of the training data set corresponding to the embodiment, next, the weights of the neural networks 60, 61, 62, 63, 64, 65 are learned based on the No. 2 data of the training data set corresponding to the embodiment using the backpropagation method. In the same way, the weights of the neural networks 60, 61, 62, 63, 64, 65 are successively learned until the No. m data of the training data set corresponding to the embodiment. If the weights of the neural network 60, 61, 62, 63, 64, 65 finish being learned based on the No. 1 to No. m data of the training data set corresponding to the embodiment, the routine proceeds to step 104.

At step 104, it is judged if the cross entropy error E has become a preset set error or less. When it is judged that the cross entropy error E has not become the preset set error or less, the routine returns to step 103 where again the weights of the neural networks 60, 61, 62, 63, 64, 65 are learned based on the training data set corresponding to the embodiment. Next, the weights of the neural network 60, 61, 62, 63, 64, 65 continue to be learned until cross entropy error E becomes the preset set error or less. At step 104, when it is judged that the cross entropy error E has become the preset set error or less, the routine proceeds to step 105 where the learned weights of the neural networks 60, 61, 62, 63, 64, 65 are stored in the memory 73 of the learning device 71. In this way, a first model estimating judgment of abnormalities able to accurately estimate if the abnormality of leakage of blow-by gas occurs or the abnormality of stuck opening of the PCV valve 22 occurs and a second model estimating judgment of abnormalities able to accurately estimate if the abnormality of stuck closing of the PCV valve 22 occurs are prepared.

Figure 31:
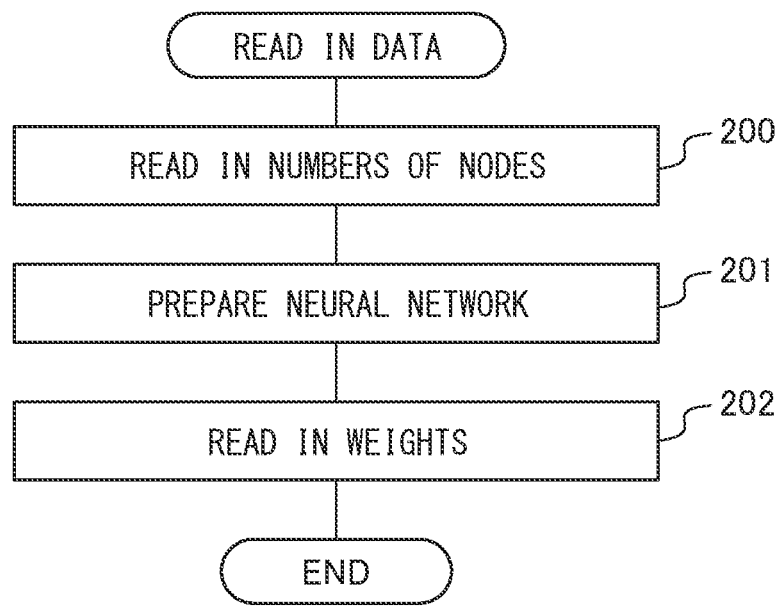
FIG. 31 is a flow chart for reading data into an electronic control unit.

In the embodiments according to the present invention, the thus prepared first model estimating judgment of abnormalities for the abnormality of leakage of blow-by gas and the abnormality of stuck opening of the PCV valve 22 and the second model estimating judgment of abnormalities for the abnormality of stuck closing of the PCV valve 22 are used to diagnose faults in the blow-by gas feed path 20 of a commercially available vehicle. For this reason, the models estimating judgment of abnormalities of the blow-by gas feed path 20 and PCV valve 22 are stored in the electronic control unit 30 of the commercially available vehicle. FIG. 31 shows the routine for reading data into the electronic control unit performed in the electronic control unit 30 for storing these models estimating judgment of abnormalities of the blow-by gas feed path 20 and PCV valve 22 in the electronic control unit 30 of the commercially available vehicle.

Referring to FIG. 31, first, at step 200, the number of nodes of the input layer (L=1) of the neural networks 60, 61, 62, 63, 64, 65, the numbers of nodes of the hidden layer (L=2) and hidden layer (L=3), and the number of nodes of the output layer (L=4) corresponding to the embodiment are read into the memory 32 of the electronic control unit 30, Next, at step 201, based on these numbers of nodes, neural networks 60, 61, 62, 63, 64, 65 corresponding to the embodiment are prepared. Next, at step 202, the learned weights of the neural networks 60, 61, 62, 63, 64, 65 are read into the memory 32 of the electronic control unit 30. Due to this, the model estimating judgment of abnormalities of the blow-by gas feed path 20 and PCV valve 22 is stored in the electronic control unit 30 of the commercially available vehicle.

Figure 32:
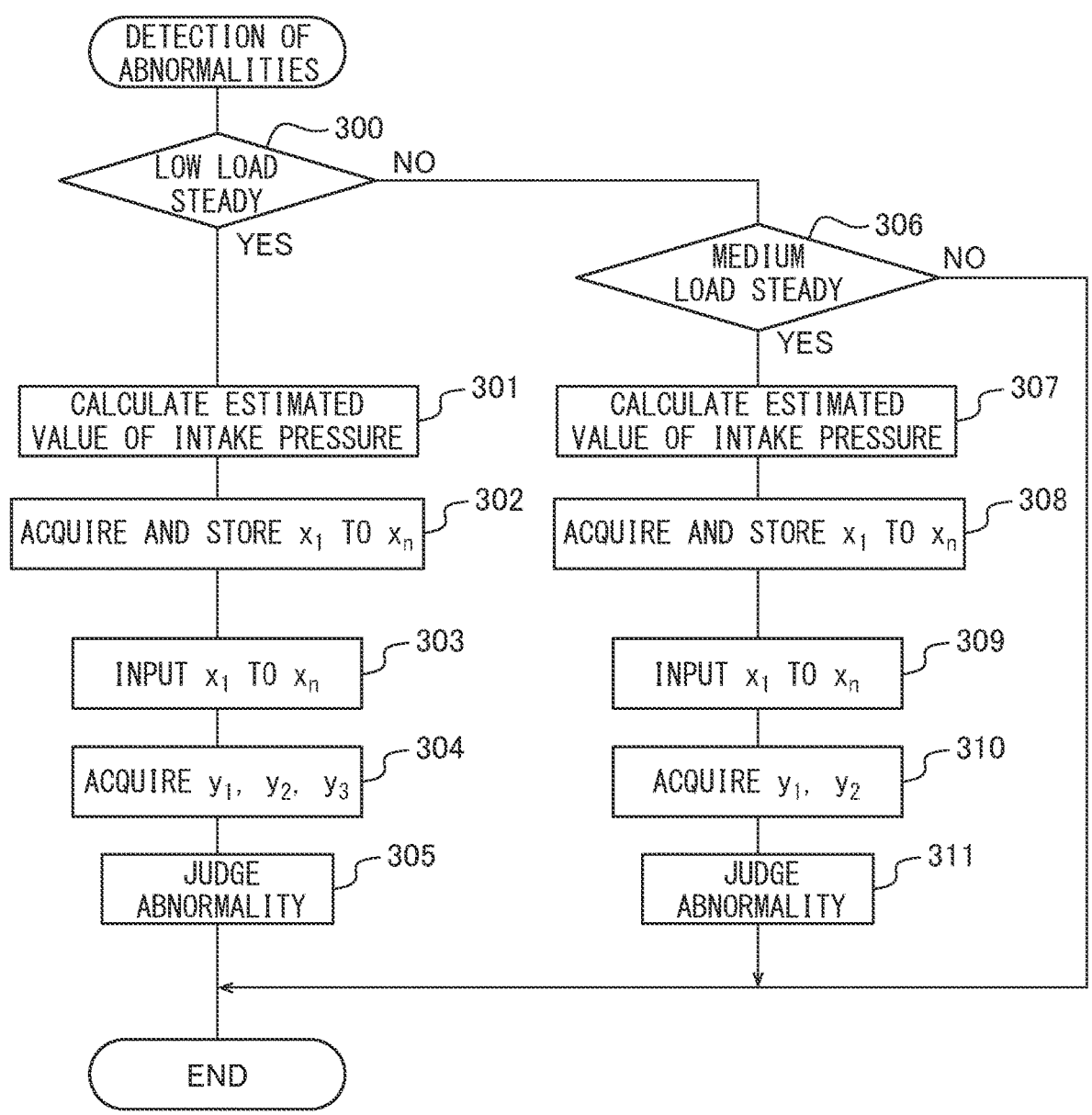
FIG. 32 is a flow chart for detecting abnormalities.

Next, referring to FIG. 32, the routine for detection of abnormalities of the blow-by gas feed path 20 and PCV valve 22 performed at a commercially available vehicle will be explained.

This routine is performed by interruption every fixed time period or by interruption at predetermined crank angles when the engine is being operated. Referring to FIG. 32, first, at step 300, it is judged if an engine low load steady operation is underway. When an engine low load steady operation is not underway, the routine proceeds to step 306 where it is judged if an engine medium load steady operation is underway. When an engine medium load steady operation is not underway, the processing cycle is ended.

On the other hand, when at step 300 it is judged that an engine low load steady operation is underway, the routine proceeds to step 301 where the estimated value of the intake pressure Pm is calculated using the amount of intake air mt, the pressure Pa inside the intake passage upstream of the throttle valve 19, and the temperature Ta inside the intake passage upstream of the throttle valve 19 respectively detected by the intake air detector 16, atmospheric pressure sensor 27, and atmospheric temperature sensor 28, and using the open area TA of the throttle valve 19 calculated based on the detected value of the throttle valve opening degree sensor 26 and the relationship shown in FIG. 9. Note that, the processing for calculation of the estimated value of the intake pressure Pm at this step 301 is performed only when detecting the abnormality of leakage of blow-by gas and the abnormality of stuck opening of the PCV valve 22 in the second embodiment and third embodiment. In the first embodiment and fourth embodiment, this step 301 is omitted when detecting the abnormality of leakage of blow-by gas and abnormality of stuck closing of the PCV valve 22.

Next, at step 302, the input value $x_1 \ldots$ input value $x_n$ are acquired and are stored inside the memory 32. In this case, the input values acquired and stored inside the memory 32 are, in the first embodiment, the engine load (input value $x_1$), engine speed (input value $x_2$), and measured value of the intake pressure Pm downstream of the throttle valve 19 (input value $x_3$), in the second embodiment, the engine load (input value $x_1$), engine speed (input value $x_2$), and estimated value of the intake pressure Pm downstream of the throttle valve 19 (input value $x_3$), in the third embodiment, the engine load (input value $x_1$), engine speed (input value $x_2$), measured value of the intake pressure Pm downstream of the throttle valve 19 (input value $x_3$), and estimated value of the intake pressure Pm downstream of the throttle valve 19 (input value $x_4$), and, in the fourth embodiment, the engine load (input value $x_1$), engine speed (input value $x_2$), amount of intake air (input value $x_3$), throttle valve opening degree (input value $x_4$), atmospheric temperature (input value $x_5$), and atmospheric pressure (input value $x_6$). Next, the routine proceeds to step 303.

Next, at step 303, the input values $x_1 \ldots x_n$ stored inside the memory 32 of the electronic control unit 30 are input to the nodes of the input layers (L=1) of the first neural networks 60, 62, 64 corresponding to the embodiment. At this time, from the output layers of the first neural networks 60, 62, 64, the output values $y_1'$, $y_2'$, $y_3'$ are output. At step 304, at this time, the output values $y_1$, $y_2$, $y_3$ converted at the softmax layer SM are acquired. Next, at step 305, the maximum output value $y_1$ is selected from the acquired output values $y_1$, $y_2$, $y_3$. When the state corresponding to the maximum output value $y_1$ is the abnormality of leakage of blow-by gas or the abnormality of stuck opening of the PCV valve 22, it is judged that an abnormality of leakage of blow-by gas or the abnormality of stuck opening of the PCV valve 22 occurs. At this time, for example, a warning light showing the abnormality of leakage of blow-by gas or the abnormality of stuck opening of the PCV valve 22 corresponding to the maximum output value $y_i$ occurs is turned on.

On the other hand, when at step 306 it is judged that an engine medium load steady operation is underway, the routine proceeds to step 307 where the estimated value of the intake pressure Pm is calculated using the amount of intake air mt, the pressure Pa inside the intake passage upstream of the throttle valve 19, and the temperature Ta inside the intake passage upstream of the throttle valve 19 respectively detected by the intake air detector 16, atmospheric pressure sensor 27, and atmospheric temperature sensor 28, and using the open area TA of the throttle valve calculated based on the detected value of the throttle valve opening degree sensor 26 and the relationship shown in FIG. 9. Note that, the processing for calculation of the estimated value of the intake pressure Pm at this step 307 is performed only when detecting the abnormality of stuck closing of the PCV valve 22 in the second embodiment and third embodiment. In the first embodiment and fourth embodiment, this step 307 is omitted when detecting the abnormality of stuck closing of the PCV valve 22.

Next, at step 308, the input value $x_1 \ldots$ input value $x_n$ are acquired and are stored in the memory 32. In this case, the input values acquired and stored in the memory 32, in the first embodiment, are the engine load (input value $x_1$), engine speed (input value $x_2$), and measured value of the intake pressure Pm downstream of the throttle valve 19 (input value $x_3$), in the second embodiment, are the engine load (input value $x_1$), engine speed (input value $x_2$), and estimated value of the intake pressure Pm downstream of the throttle valve 19 (input value $x_3$), in the third embodiment, are the engine load (input value $x_1$), engine speed (input value $x_2$), measured value of the intake pressure Pm downstream of the throttle valve 19 (input value $x_3$), and estimated value of the intake pressure Pm downstream of the throttle valve 19 (input value $x_4$), and, in the fourth embodiment, the engine load (input value $x_1$), engine speed (input value $x_2$), amount of intake air (input value $x_3$), throttle valve opening degree (input value $x_4$), atmospheric temperature (input value $x_5$), and atmospheric pressure (input value $x_6$). Next, the routine proceeds to step 309.

At step 309, the input values $x_1 \ldots x_n$ stored inside the memory 32 of the electronic control unit 30 are input into the nodes of the input layer (L=1) of the second neural networks 61, 63, 65 corresponding to the embodiment. At this time, from the nodes of the output layer of the second neural networks 61, 63, 65, the output values $y_1'$, $y_2'$ are output while at step 310, at this time, the output values $y_1$, $y_2$ converted at the softmax layer SM are acquired. Next, at step 311, the maximum output value $y_1$ is selected from the acquired output values $y_1$, $y_2$. When the state corresponding to the maximum output value $y_1$ is the abnormality of stuck closing of the PCV valve 22, it is judged that the abnormality of stuck closing of the PCV valve 22 occurs. At this time, for example, a warning light showing that the abnormality of stuck closing of the PCV valve 22 occurs is turned on.

In this way, in an embodiment according to the present invention, there is provided a system for detecting an abnormality in a blow-by gas feed path in an internal combustion engine arranging the intake air amount detector 16 in the engine intake passage and arranging the throttle valve 19 in the engine intake passage downstream of the intake air detector 16, having blow-by gas in the engine crankcase 2 fed through the blow-by gas feed path 20 into the engine intake passage downstream of the throttle valve 19, and having the PCV valve 22 controlling the amount of flow of blow-by gas in the blow-by gas feed path 20, in which a learned first neural network 60 learned in weights using the engine load, engine speed, and intake pressure in the engine intake passage downstream of the throttle valve 19 as input parameters of the first neural network 60 and using leakage of blow-by gas from the blow-by gas feed path 20 as a truth label is stored and, at the time of operation of a vehicle, this learned neural network 60 is used to detect the abnormality of leakage of blow-by gas from the blow-by gas feed path 20 from the input parameters.

In this case, in one embodiment according to the present invention, the intake pressure inside the engine intake passage downstream of the throttle valve 19 is the measured value, while in another embodiment according to the present invention, the intake pressure inside the engine intake passage downstream of the throttle valve 19 is the estimated value estimated based on the amount of intake air detected by the intake air detector 16, atmospheric pressure, atmospheric temperature, and opening degree of the throttle valve 19.

Further, in the embodiments according to the present invention, a learned first neural network 60 learned in weights using the engine load, engine speed, and intake pressure in the engine intake passage downstream of the throttle valve 19 at the time of engine low load steady operation as input parameters of the first neural network 60 and using leakage of blow-by gas from the blow-by gas feed path 20 as a truth label is stored and, at the time of operation of a vehicle, this learned first neural network 60 is used to detect the abnormality of leakage of blow-by gas from the blow-by gas feed path 20 from the input parameters.

Furthermore, in the embodiments according to the present invention, a learned first neural network 60 learned in weights using the engine load, engine speed, and intake pressure in the engine intake passage downstream of the throttle valve 19 at the time of engine low load steady operation as input parameters of the first neural network 60 and using leakage of blow-by gas from the blow-by gas feed path 20 and the abnormality of stuck opening of the PCV valve 22 continuing to remain open as truth labels is stored and, at the time of engine low load steady operation of the vehicle, this learned first neural network 60 is used to detect the abnormality of leakage of blow-by gas from the blow-by gas feed path 20 and the abnormality of stuck opening of the PCV valve 22 from the input parameters.

Furthermore, in the embodiments according to the present invention, a learned first neural network 62 learned in weights using the engine load, engine speed, measured value of the intake pressure in the engine intake passage downstream of the throttle valve 19, and estimated value of the intake pressure in the engine intake passage downstream of the throttle valve 19 at the time of engine low load steady operation as input parameters of the first neural network 62 and using leakage of blow-by gas from the blow-by gas feed path 20 as a truth label is stored and, at the time of engine low load steady operation, this learned neural network 62 is used to detect the abnormality of leakage of blow-by gas from the blow-by gas feed path 20 from the input parameters at the time of engine low load steady operation.

Furthermore, in the embodiments according to the present invention, a learned first neural network 60 learned in weights using the engine load, engine speed, and intake pressure in the engine intake passage downstream of the throttle valve 19 at the time of engine low load steady operation as input parameters of the first neural network 60 and using leakage of blow-by gas from the blow-by gas feed path 20 as a truth label is stored, and a learned second neural network 61 learned in weights using the engine load, engine speed, and intake pressure in the engine intake passage downstream of the throttle valve 19 at the time of engine medium load steady operation as input parameters of the second neural network 61 and using the abnormality of stuck closing of the PCV valve remaining closed as a truth label is stored. At the time of engine low load steady operation, the learned first neural network 60 is used to detect the abnormality of leakage of blow-by gas from the blow-by gas feed path 20 from the input parameters at the time of engine low load steady operation and, at the time of engine medium load steady operation, the learned second neural network 61 is used to detect the abnormality of stuck closing of the PCV valve 22 from the input parameters at the time of engine medium load steady operation.

Furthermore, in the embodiments according to the present invention, a learned first neural network 60 learned in weights using the engine load, engine speed, and intake pressure in the engine intake passage downstream of the throttle valve 19 at the time of engine low load steady operation as input parameters of the first neural network 60 and using leakage of blow-by gas from the blow-by gas feed path 20 and the abnormality of stuck opening of the PCV valve 22 continuing to remain open as truth labels is stored, and a learned second neural network 61 learned in weights using the engine load, engine speed, and intake pressure in the engine intake passage downstream of the throttle valve 19 at the time of engine medium load steady operation as input parameters of the second neural network 61 and using the abnormality of stuck closing of the PCV valve 22 remaining closed as a truth label is stored. At the time of engine low load steady operation, the learned first neural network 60 is used to detect the abnormality of leakage of blow-by gas from the blow-by gas feed path 20 and the abnormality of stuck opening of the PCV valve 22 from the input parameters at the time of engine low load steady operation and, at the time of engine medium load steady operation, the learned second neural network 61 is used to detect the abnormality of stuck closing of the PCV valve 22 from the input parameters at the time of engine medium load steady operation.

Furthermore, according to the present invention, there is provided a system for detecting an abnormality in a blow-by gas feed path in an internal combustion engine arranging the intake air detector 16 in the engine intake passage and arranging the throttle valve 19 in the engine intake passage downstream of the intake air detector 16, having blow-by gas in an engine crankcase 2 fed through the blow-by gas feed path 20 into the engine intake passage downstream of the throttle valve 19, and having the PCV valve 22 controlling the amount of flow of blow-by gas in the blow-by gas feed path 20, in which a learned first neural network 64 learned in weights using the engine load, engine speed, amount of intake air detected by the intake air amount detector 16, atmospheric pressure, atmospheric temperature, and opening degree of the throttle valve 19 as input parameters of the first neural network 64 and using leakage of blow-by gas from the blow-by gas feed path 20 as a truth label is stored and, at the time of operation of a vehicle, the learned first neural network 64 is used to detect the abnormality of leakage of blow-by gas from the blow-by gas feed path 20 from the input parameters.

The invention claimed is:

1. A system for detecting an abnormality in a blow-by gas feed path in an internal combustion engine, comprising:
   an intake air amount detector arranged in an engine intake passage,
   a throttle valve arranged in the engine intake passage downstream of the intake air amount detector, blow-by gas in an engine crankcase being fed through the blow-by gas feed path into the engine intake passage downstream of the throttle valve, and
   a PCV valve arranged in the blow-by gas feed path to control an amount of flow of blow-by gas, wherein
   a learned neural network learned in weights using an engine load, an engine speed, and an intake pressure in the engine intake passage downstream of the throttle valve as input parameters of the neural network and using an abnormality of a leakage of blow-by gas from the blow-by gas feed path and an abnormality of a stuck opening of the PCV valve continuing to remain open as truth labels respectively is stored, and
   the learned neural network is used to detect the abnormality of the leakage of blow-by gas from the blow-by gas feed path and the abnormality of the stuck opening of the PCV valve from the input parameters.

2. The system for detecting an abnormality in a blow-by gas feed path in an internal combustion engine according to claim 1, wherein the intake pressure in the engine intake passage downstream of the throttle valve is an estimated value estimated based on an amount of intake air detected by the intake air amount detector, an atmospheric pressure, an atmospheric temperature, and an opening degree of the throttle valve.

3. A system for detecting an abnormality in a blow-by gas feed path in an internal combustion engine, comprising:
   an intake air amount detector arranged in an engine intake passage,
   a throttle valve arranged in the engine intake passage downstream of the intake air amount detector, blow-by gas in an engine crankcase being fed through the blow-by gas feed path into the engine intake passage downstream of the throttle valve, and a PCV valve arranged in the blow-by gas feed path to control an amount of flow of blow-by gas, wherein a learned neural network learned in weights using an engine load, an engine speed, a measured value of an intake pressure in the engine intake passage downstream of the throttle valve, and an estimated value of the intake pressure in the engine intake passage downstream of the throttle valve as input parameters of the neural network and using an abnormality of a leakage of blow-by gas from the blow-by gas feed path as a truth label is stored, and the learned neural network is used to detect the abnormality of the leakage of blow-by gas from the blow-by gas feed path from the input parameters.

4. A system for detecting an abnormality in a blow-by gas feed path in an internal combustion engine, comprising:

an intake air amount detector arranged in an engine intake passage, a throttle valve arranged in the engine intake passage downstream of the intake air amount detector, blow-by gas in an engine crankcase being fed through the blow-by gas feed path into the engine intake passage downstream of the throttle valve, and a PCV valve arranged in the blow-by gas feed path to control an amount of flow of blow-by gas, wherein a learned first neural network learned in weights using an engine load, an engine speed, and an intake pressure in the engine intake passage downstream of the throttle valve at a time of engine low load steady operation as input parameters of the first neural network and using an abnormality of a leakage of blow-by gas from the blow-by gas feed path as a truth label is stored, a learned second neural network learned in weights using an engine load, an engine speed, and an intake pressure in the engine intake passage downstream of the throttle valve at a time of engine medium load steady operation as input parameters of the second neural network and using an abnormality of a stuck closing of the PCV valve remaining closed as a truth label is stored, at the time of engine low load steady operation, the learned first neural network is used to detect the abnormality of the leakage of blow-by gas from the blow-by gas feed path from the input parameters at the time of engine low load steady operation, and at the time of engine medium load steady operation, the learned second neural network is used to detect the abnormality of the stuck closing of the PCV valve from the input parameters at the time of engine medium load steady operation.

5. The system for detecting an abnormality in a blow-by gas feed path in an internal combustion engine according to claim 1, wherein a learned first neural network learned in weights using an engine load, an engine speed, and an intake pressure in the engine intake passage downstream of the throttle valve at a time of engine low load steady operation as input parameters of the first neural network and using the abnormality of the leakage of blow-by gas from the blow-by gas feed path and the abnormality of the stuck opening of the PCV valve continuing to remain open as truth labels is stored, a learned second neural network learned in weights using an engine load, an engine speed, and an intake pressure in the engine intake passage downstream of the throttle valve at a time of engine medium load steady operation as input parameters of the second neural network and using an abnormality of a stuck closing of the PCV valve remaining closed as a truth label is stored, at the time of engine low load steady operation, the learned first neural network is used to detect the abnormality of the leakage of blow-by gas from the blow-by gas feed path and the abnormality of the stuck opening of the PCV valve from the input parameters at the time of engine low load steady operation, and at the time of engine medium load steady operation, the learned second neural network is used to detect the abnormality of the stuck closing of the PCV valve from the input parameters at the time of engine medium load steady operation.

6. The system for detecting an abnormality in a blow-by gas feed path in an internal combustion engine according to claim 3, wherein the estimated value of the intake pressure is estimated based on an amount of intake air detected by the intake air amount detector, an atmospheric pressure, an atmospheric temperature, and an opening degree of the throttle valve.

7. The system for detecting an abnormality in a blow-by gas feed path in an internal combustion engine according to claim 4, wherein the intake pressure in the engine intake passage downstream of the throttle valve is an estimated value estimated based on an amount of intake air detected by the intake air amount detector, an atmospheric pressure, an atmospheric temperature, and an opening degree of the throttle valve.

* * * * *